United States Patent [19]

Affaticati et al.

[11] Patent Number: 5,588,520
[45] Date of Patent: Dec. 31, 1996

[54] CROSSBELT SORTATION SYSTEM

[75] Inventors: Artemio Affaticati, Cadeo; Claudio Cerutti, Borgomanero; Teodoro Ceglia, Turin, all of Italy

[73] Assignee: Rapistan Demag Corp., Grand Rapids, Mich.

[21] Appl. No.: 606,547

[22] Filed: Feb. 26, 1996

Related U.S. Application Data

[63] Continuation of Ser. No. 300,968, Sep. 6, 1994, abandoned.

[51] Int. Cl.$^6$ .................................................. B65G 47/46
[52] U.S. Cl. ............................... 198/370.06; 198/502.2
[58] Field of Search ........................ 198/370.04, 370.06, 198/502.2, 357, 358, 349.6, 502.3

[56] References Cited

U.S. PATENT DOCUMENTS

| | | |
|---|---|---|
| 3,231,068 | 1/1966 | Harrison et al. . |
| 3,242,342 | 3/1966 | Gabar ........................ 198/502.2 X |
| 3,451,522 | 6/1969 | Ahlstedt . |
| 3,485,339 | 12/1969 | Miller et al. . |
| 3,491,903 | 1/1970 | Hedrick et al. . |
| 3,515,254 | 6/1970 | Gary . |
| 3,550,748 | 12/1970 | Hauer . |
| 3,747,781 | 7/1973 | Daigle et al. . |
| 3,817,368 | 6/1974 | Wentz et al. . |
| 3,912,071 | 10/1975 | Nielsen . |
| 3,982,625 | 9/1976 | Wentz et al. . |
| 4,031,998 | 6/1977 | Suzuki et al. ..................... 198/370.04 |
| 4,096,936 | 6/1978 | Nielsen . |
| 4,326,624 | 4/1982 | Ewertowski et al. . |
| 4,399,904 | 8/1983 | Canziani . |
| 4,429,781 | 2/1984 | Holzhäuser . |
| 4,712,965 | 12/1987 | Canziani . |
| 4,722,430 | 2/1988 | Canziani . |
| 4,763,771 | 8/1988 | Geerts . |
| 4,781,281 | 11/1988 | Canziani . |
| 4,801,000 | 1/1989 | Canziani . |
| 4,815,582 | 3/1989 | Canziani . |
| 4,915,209 | 4/1990 | Canziani . |
| 4,938,335 | 7/1990 | Canziani . |
| 5,161,930 | 11/1992 | Canziani . |

FOREIGN PATENT DOCUMENTS

| | | |
|---|---|---|
| 971503 | 7/1975 | Canada . |
| 0234653 | 9/1987 | European Pat. Off. . |
| 0305755 | 3/1989 | European Pat. Off. . |
| 0343613 | 11/1989 | European Pat. Off. . |

(List continued on next page.)

*Primary Examiner*—D. Glenn Dayoan
*Attorney, Agent, or Firm*—Van Dyke, Gardner, Linn & Burkhart, LLP

[57] ABSTRACT

The present application discloses a method and apparatus for conveying parcels on a plurality of transport units (32) moving in a conveying path (30) between an induction station (26) and a discharge station (28). The invention provides the ability to handle parcels having a length greater than the length of a single transport unit by providing the ability to induct such parcel onto two contiguous transport units (32) and to discharge the parcel from the two contiguous transport units to a selected receiving port (46). For longer parcels, having a length greater than a given length, the parcel is inducted to two contiguous transport units by operating the induction belts and the carrier belts of the two contiguous transport units in a manner which positions the parcel on the two transport units. The carrier belts of the two transport units are operated in a manner that rotates longer parcels, having a length greater than the given length, in order to position the parcel on the two transport units. Crossbelt sortation system (25) is provided with a transport unit test station (96) that is positioned adjacent to the conveying path. The purpose of the test station is to test movement of the carrier belt associated with individual ones of the transport units passing the test station. Each of the transport units (32) includes a magnet (204a, 204b) that moves in proportion to the linear speed of the carrier belt (36) associated with that transport unit. The test station includes a sensor (200) that senses the magnet of a transport unit passing the test station. The sensor includes at least one Hall-effect cell (208a, 208b) and a magnetic antenna (210) coupled with the Hall-effect cell.

63 Claims, 17 Drawing Sheets

FOREIGN PATENT DOCUMENTS

| | | |
|---|---|---|
| 0366857 | 5/1990 | European Pat. Off. . |
| 0481341 | 4/1992 | European Pat. Off. . |
| 0425021 | 10/1993 | European Pat. Off. . |
| 2469366 | 5/1981 | France . |
| 57-141310 | 9/1982 | Japan . |
| 8900974 | 11/1990 | Netherlands . |
| 1252256 | 8/1986 | U.S.S.R. . |
| 2111933 | 7/1983 | United Kingdom . |
| 2140371 | 11/1984 | United Kingdom . |
| 2144698 | 3/1985 | United Kingdom . |
| 2153801 | 8/1985 | United Kingdom . |
| 2184416 | 6/1987 | United Kingdom . |
| 2189758 | 11/1987 | United Kingdom . |
| 2197633 | 5/1988 | United Kingdom . |
| 2224147 | 4/1990 | United Kingdom . |
| WO9315986 | 8/1993 | WIPO . |

CB = CODING BELT
BB = BUFFER BELT
SB = SYNCHRONIZATION BELT
LB = LOADING BELT

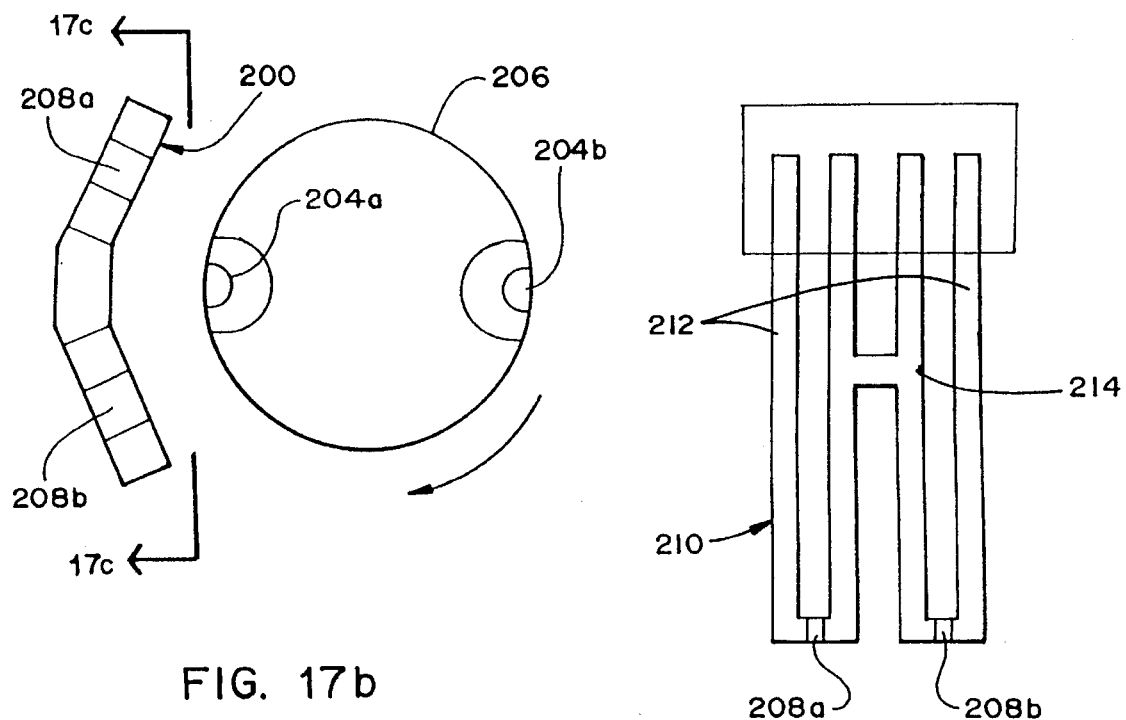
FIG. 17b
FIG. 17c
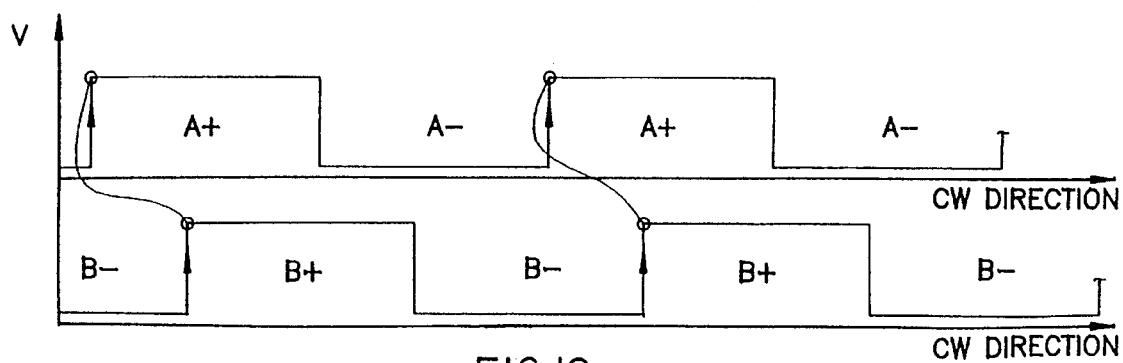
FIG. 18a
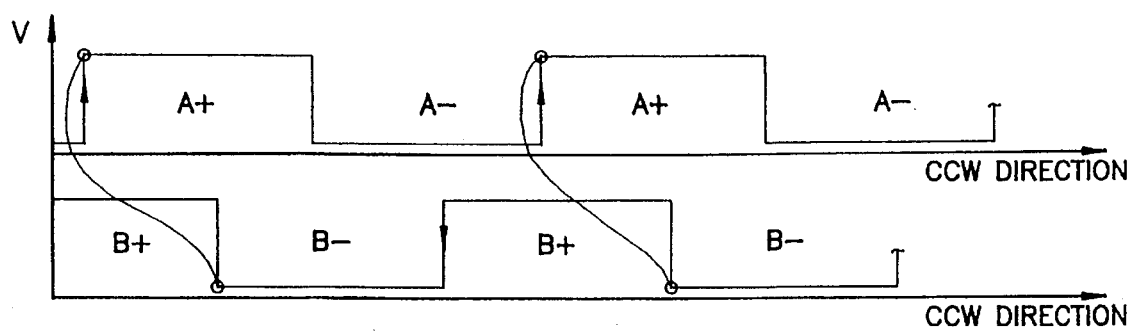
FIG. 18b 5,588,520

CROSSBELT SORTATION SYSTEM

This is a continuation of application Ser. No. 08/300,968, filed on Sep. 6, 1994, abandoned.

BACKGROUND OF THE INVENTION

This invention relates generally to parcel sortation systems and, more particularly, to systems which discharge parcels individually supported on transport units to selected receiving ports. The transport units have individual carrier belts, which are operable perpendicular to the conveying path of unit movement in order to discharge the parcel to the selected destination port.

Crossbelt sortation systems are known for their ability to handle parcels of widely varying characteristics. For example, such systems may be used to sort magazines or envelopes at a postal center, frozen food articles, cellophane-wrapped clothing articles, or the like. Crossbelt sortation systems are so widely adaptable because the parcels are loaded onto carrier belts, moveable on transport units orthogonally of the conveying path of the parcels, and discharged from the transport units with the assistance of the carrier belts. In addition to accommodating parcels of varying characteristics, crossbelt sortation systems are capable of being compact because they are able to discharge parcels to closely spaced receiving ports on both sides of the conveying path. Furthermore, parcels may be inducted to the transport units at various separate locations using a plurality of induction stations.

Crossbelt sortation systems are not without their difficulties. Although such systems have been capable of handling parcels of varying characteristics, the size of the handled parcels has been limited by the dimensions of the upper surface of the carrier belt, the induction belt width, and the receiving port width. Therefore, in order to handle larger packages, it has been necessary to increase the size of the transport units, the induction belts, and the receiving ports. This results in a direct increase in system cost and operating expense. Importantly, it is in direct conflict with the goal of providing a compact system.

Another difficultly with crossbelt sortation systems is the relative complexity of the series of transport units, which units creates the need for a constant monitoring of the transport units in order to determine when a unit is not properly functioning. In order to determine that a transport unit is not functioning, it is known to mount magnets to the drive pulley or idle pulley supporting the carrier belt of each transport unit. As an non-loaded transport unit passes a carrier station, a command is given to the transport unit to operate the belt according to a known velocity profile. A stationary-mounted pickup coil receives an induced voltage from the rotating magnets and control circuitry converts the induced voltage into a speed signal. However, the voltage induced in the pickup coil is sensitive to the speed of magnet movement as well as the distance between the magnet and the coil. Accordingly, such systems are not always reliable and require frequent calibration in order to ensure operability.

SUMMARY OF THE INVENTION

The present invention provides a method and apparatus for conveying parcels on a plurality of transport units moving in a conveying path between an induction station and a discharge station. Each transport unit has a driven carrier belt thereon, which is moveable orthogonally to the conveying path. The induction station includes a plurality of tandem driven induction belts, extending at an angle to the conveying path. The discharge station has a plurality of receiving ports positioned along the conveying path.

According to a first aspect, the invention provides the ability to handle parcels having a length greater than the length of a single transport unit by providing the ability to induct such parcel onto two contiguous transport units and to discharge the parcel from the two contiguous transport units to a selected receiving port. This may be accomplished by determining whether a parcel has a length less than or greater than a given length. For parcels shorter than the given length, induction belts are operated and the carrier belt of one of the transport units is operated to position such parcel on one of the transport units. For longer parcels, having a length greater than the given length, the parcel is inducted to two contiguous transport units by operating the induction belts and the carrier belts of the two contiguous transport units in a manner which positions the parcel on the two transport units.

According to another aspect of the invention, the carrier belts of the two transport units are operated in a manner that rotates longer parcels, having a length greater than the given length, in order to position the parcel on the two transport units. This allows parcels of great length to be inducted without adding to the width of the induction station. This rotation is accomplished by operating the carrier belts of the two contiguous transport units until a parcel is positioned over the leading one of the transport units. The carrier belt of the leading transport unit is then stopped and the carrier belt of the following transport unit continues to operate until the parcel is rotated into position on the two transport units.

According to yet another aspect of the invention, a parcel conveyed on two contiguous transport units is discharged to a receiving port by rotating the parcel concurrently with discharging that parcel. The rotation is accomplished initially by operating the carrier belt of the forward transport unit while not operating the carrier belt of the trailing unit. After a time delay, the carrier belt of the trailing unit is actuated in order to complete the rotation and discharge the parcel to the receiving port. The operation of the carrier belt of the forward transport unit and the operation of the carrier belt of the trailing transport unit are preferably initiated at the same fixed location with respect to the selected receiving port.

As a result of the invention, long parcels may be accommodated without a commensurate increase in the width of the induction station or the receiving port. This is important in order to retain the compact configuration of a crossbelt sortation system while accommodating the handling of long packages.

According to yet another aspect of the invention, a crossbelt sortation system is provided with a transport unit test station that is positioned adjacent to the conveying path. The purpose of the test station is to test movement of the carrier belt associated with individual ones of the transport units passing the test station. Each of the transport units includes a magnet that moves in proportion to the linear speed of the carrier belt associated with that transport unit. The test station includes a sensor that senses the magnet of a transport unit passing the test station. The sensor includes at least one magnetic-field sensitive device and a magnetic antenna coupled with the device. In a preferred embodiment, the magnetic antenna is made from a ferromagnetic material and includes a pair of pole shoes that are elongated in the direction of movement of the transport units along the conveying path and are galvanically isolated by the field-sensitive device, which is a Hall-effect cell. This arrangement provides a unique interaction between the Hall-effect cell and the pole shoes that provides reliable detection of the movement of the transport unit magnet without excessive sensitivity to either the speed of the magnet movement or the separation distance between the magnet and the sensor. Furthermore, the test station may be made sensitive to the direction of movement of the magnet in order to test not only the velocity profile of the belt but also the correct directional movement of the belt.

These and other objects, advantages, and features of this invention will become apparent upon review of the following specification in conjunction with the drawings.

BRIEF DESCRIPTION OF THE DRAWINGS

FIG. 17b is an enlarged side elevation of the test station sensor and transport unit pulley in FIG. 17a;

FIG. 17c is a view taken in the direction 17c–17c in FIG. 17b;

FIG. 18a is a signal diagram illustrating carrier belt direction determination for the test station in FIGS. 17a–17c in the clockwise direction;

FIG. 18b is a signal diagram illustrating carrier belt direction determination for the test station in FIGS. 17a–17c in the counterclockwise direction;

DESCRIPTION OF THE PREFERRED EMBODIMENT

Figure 1:
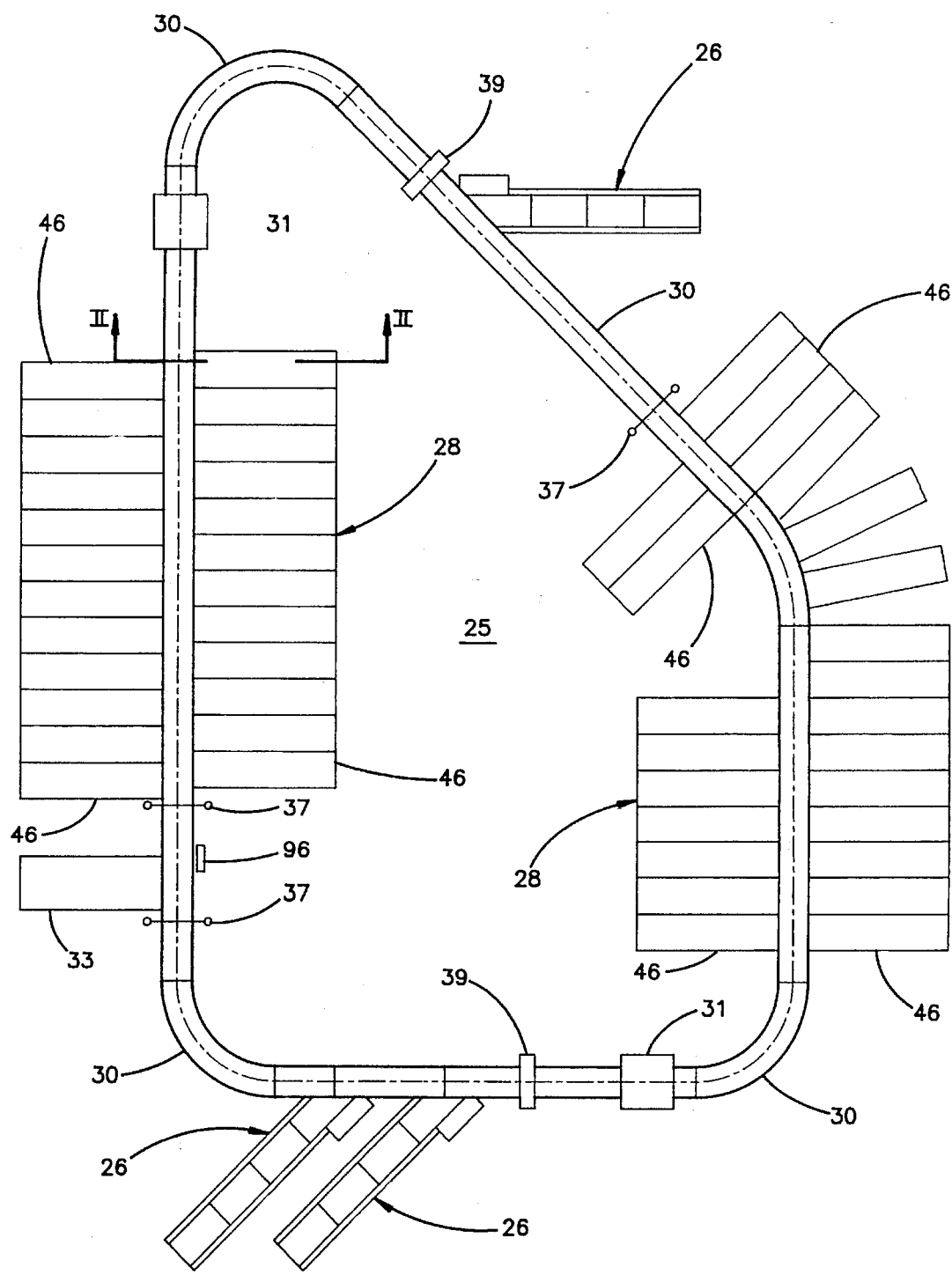
FIG. 1 is a top plan view of a crossbelt sortation system, according to the invention.
Figure 3:
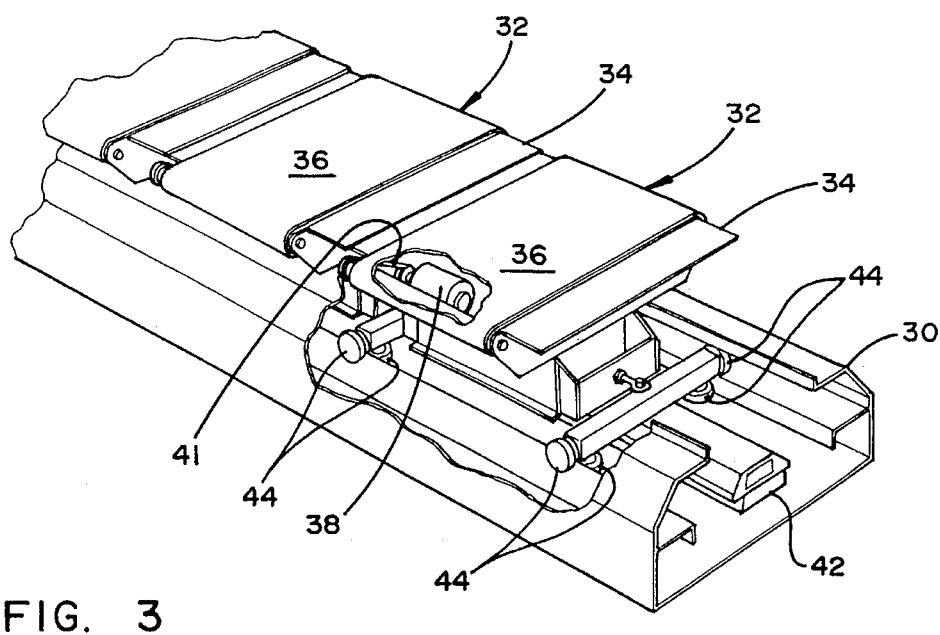
FIG. 3 is a perspective view of a chain of transport units with portions thereof removed in order to reveal additional details of the mechanical components.
Figure 6:
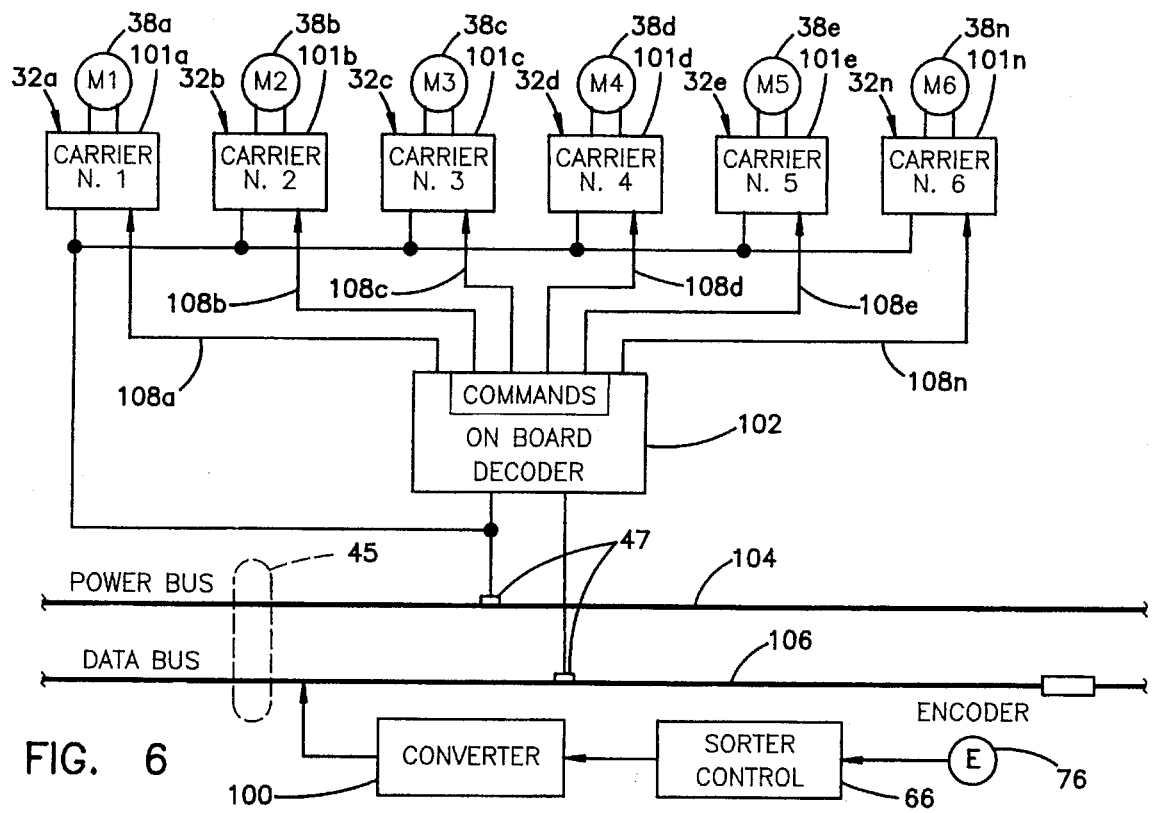
FIG. 6 is a block diagram of an electrical control for transport unit carrier belt activation.

Referring now specifically to the drawings, and the illustrative embodiments depicted therein, a crossbelt sortation system 25 includes one or more parcel induction stations 26 and one or more discharge stations 28 interconnected by an annular conveying path 30 (FIG. 1). A plurality of transport units 32 move continuously along conveying path 30 (FIG. 3). Each transport unit includes a frame 34 and a carrier belt 36, which is supported on the frame driven by a drive means 38 in a direction orthogonal the motion of transport unit 32 along guide path 30. In the illustrative embodiment, drive means 38 is an electrical motor coupled to a carrier belt drive pulley by a cog belt 41 and capable of driving carrier belt 36 in two opposite directions under the control of a servo drive 101. Transport units 32 may be coupled by a coupling means 40 in order to move in unison in one or more trains along conveying path 30. Transport units 32 are propelled along conveying path 30 by a linear motor 42 whose stator extends along guide path 30. Each transport unit 32 is supported for movement along conveying path 30 by a set of vertical and horizontal guide wheels 44. An insulated bus 45 positioned within conveying path 30 supplies electrical power and data signals to transport units 32 through one or more pick-up shoe assemblies (FIG. 6).

Figure 5:
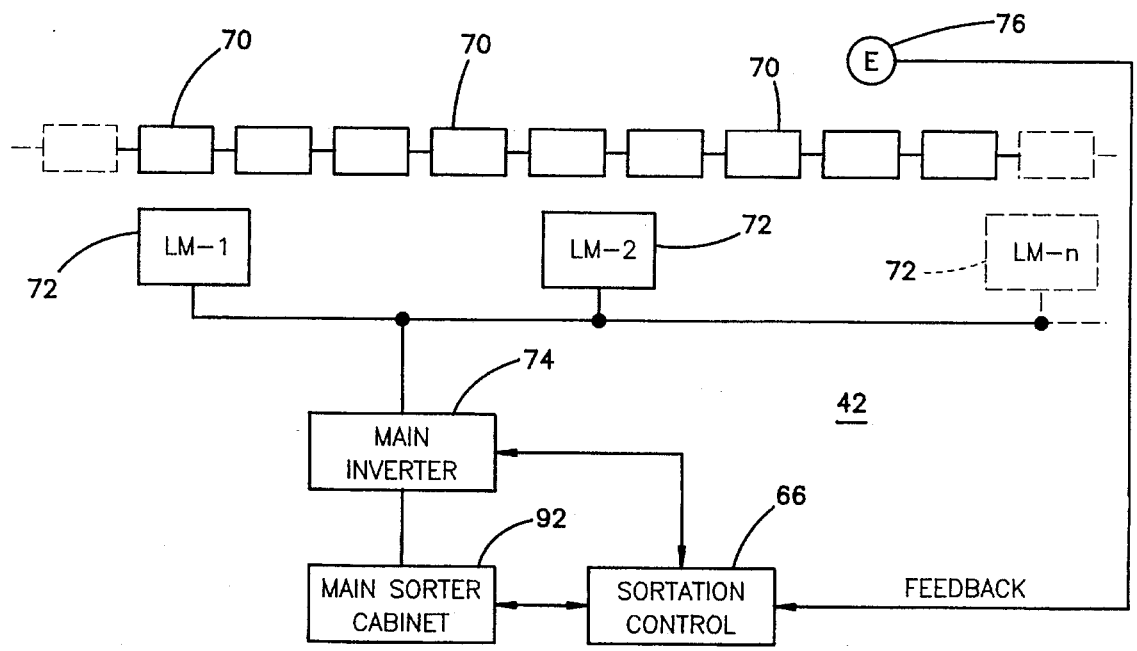
FIG. 5 is a block diagram of an electrical system for propelling transport units.

Linear motor 42 includes a conductor plate 70 installed on the bottom of each transport unit 32, which form the secondary side of the linear motor (FIG. 5). A plurality of primary side stators 72 are installed on straight track sections at a spacing of approximately 30 transport units. The linear motor primary side stators are controlled by a main invertor 74, which modulate the output frequency in response to a command signal from a sortation control 66. The sorting velocity of the transport units is regulated by sortation control 66 in response to an encoder 76 and a speed reference established in control 66. In the illustrated embodiment, sortation control 66 selects a transport unit speed from among three different velocities (V1, V2, V3) which may be selected from a range that extends from approximately 1 m/sec to 2.5 m/sec. In the illustrated embodiment, linear motor 42 operates at a nominal voltage of 420 AC, 3-phase, at 50/60 Hz.

Figure 2:
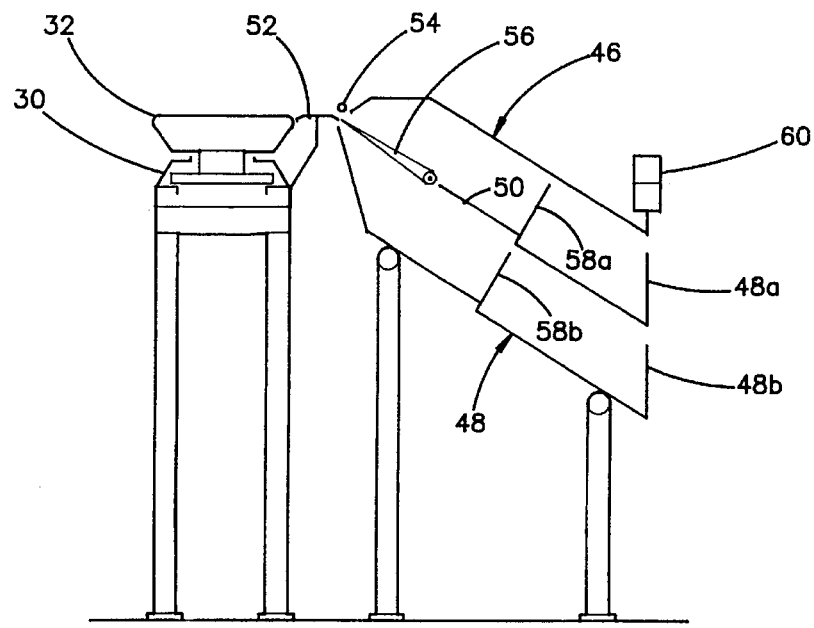
FIG. 2 is an elevation taken along the lines II—II in FIG. 1.
Figure 2A:
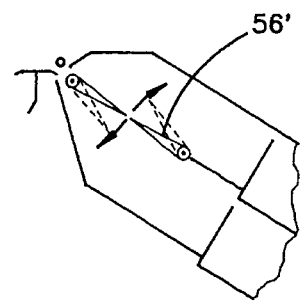
FIG. 2a is the same view as FIG. 2, illustrating an alternative flap structure.
Figure 4:
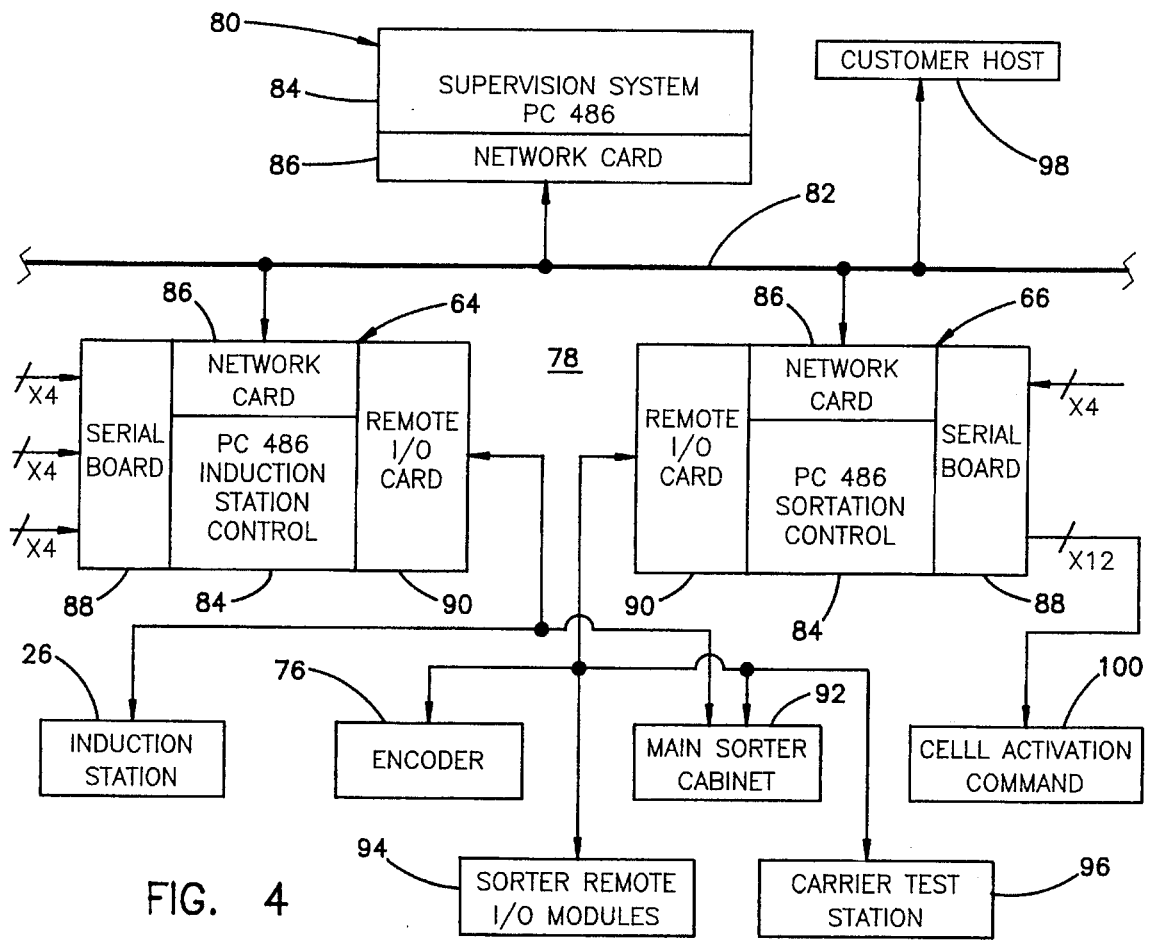
FIG. 4 is a block diagram of an electrical control network for the system in FIG. 1.

Each discharge station 28 is made up of a plurality of receiving ports 46, which may be all positioned on one side of conveying path 30, or on opposite sides of conveying path 30, depending upon the particular details of the application. In the illustrated embodiment, receiving port 46 includes an inclined chute 48 which is divided by a wall 50 into an upper chute 48a and a lower chute 48b (FIG. 2). A transition plate 52 provides a mechanical interface between transport unit 32 and chute 48. Plate 52 additionally reduces parcel velocity and aerodynamic effects on thin items. A photodetector 54, included with each chute 48, detects chute full conditions. A flap 56 directs parcels from transport unit 32 into either upper chute 48a or lower chute 48b. Flap 56 may be made with sheet metal, or belt or roller conveyor material, and may be either single or double according to the requirements of the application. An alternative flap 56' includes a pair of diverter arms which actuate in opposite directions to selectively direct parcels in the upper chute 48a or lower chute 48b (FIG. 2a). Each chute section 48a and 48b may include a divider 58a, 58b, respectively, which may be selectively erected in order to enable packing personnel to pack an order when the sortation system is assembling the next order and may be operable by a push button, or other suitable means. An indicator 60 may be provided to alert the packer or operator of conditions such as full chute, end-of-batch, shutdown of the sortation system, or the like. A scanner 31 upstream of each discharge station 28 along conveying path 30 (FIG. 1) inputs to sortation control 66 information scanned from each parcel to either identify each parcel or confirm the identification of each parcel (FIG. 4). A reject chute 33 is provided for receipt of parcels whose discharge to a receiving port 46 is aborted.

Figure 7:
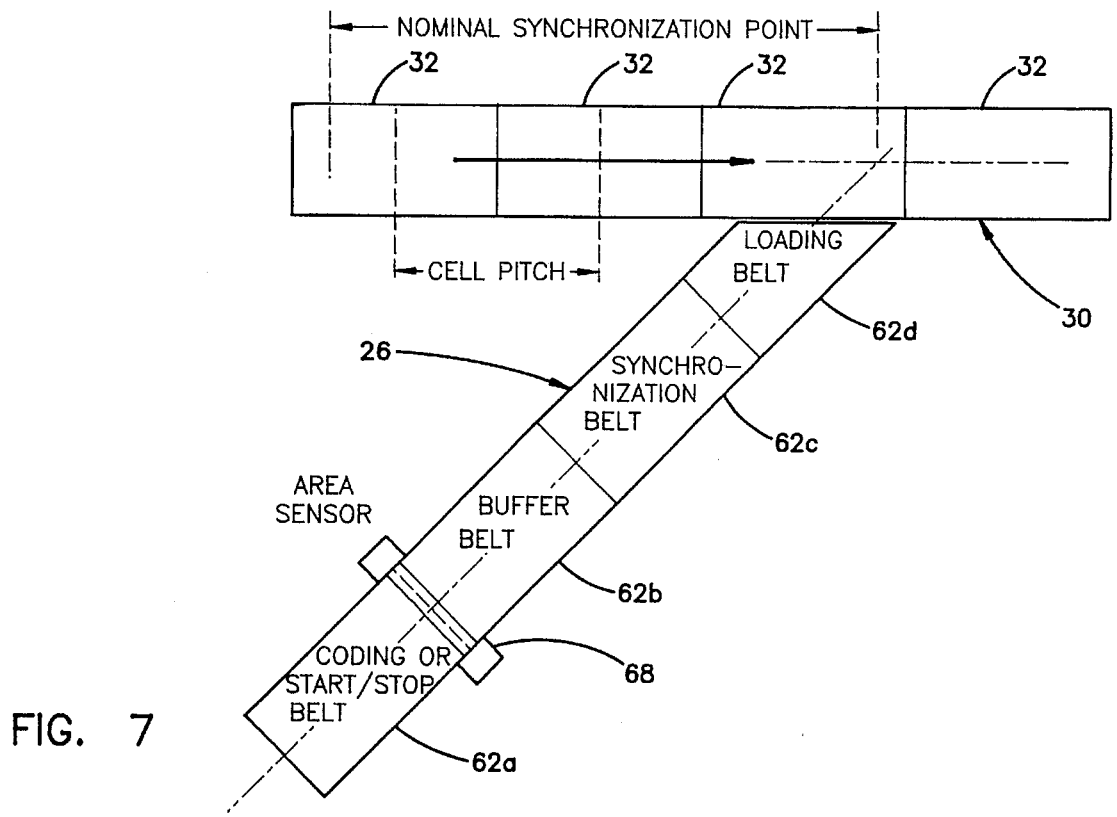
FIG. 7 is a plan view of an induction station.

Each induction station 26, which is under the control of an induction control 64, includes a series of individually controlled tandem belts aligned at an angle with conveying path 30 (FIG. 7). The induction station includes, in the order of parcel movement, a coding belt 62a, a buffer belt 62b, a synchronization belt 62c, and a loading belt 62d. As will be set forth in more detail below, coding belt 62a regulates the feeding of parcels to a parcel sensor 68. Coding belt 62a additionally provides a start/stop function to allow an operator to enter item codification and to correct parcel orientation, if incorrect. Parcel sensor 68 determines the length, width, and lateral position of each parcel on induction station 26. Buffer belt 62b receives a parcel from coding belt 62a and retains the parcel until synchronization belt 62c has discharged a prior parcel. Synchronization belt 62c receives a parcel from buffer belt 62b, requests reservation of one or two transport units from sortation control 66, and initiates acceleration of the parcel at the appropriate time. Loading belt 62d receives a parcel from synchronization belt 62c and accelerates the parcel according to a fixed velocity profile until the parcel is loaded onto an available transport unit. A loadability photosensor 37 upstream of each induction station 26, along conveying path 30, identifies or confirms which transport units 32 are not loaded and, therefore, available to be "booked" by the induction station for loading of a particular parcel. A recentering station 39, of the type well known in the art, may be provided downstream of each induction station 26 along the conveying path. Such recentering station verifies, by the use of photosensors or other means, that each parcel is centered on its carrier belt and, if not, the carrier belt is jogged to recenter the parcel.

Crossbelt sortation system 25 is controlled by a control system 78 including a supervision system 80 joined with induction control 64 and sortation control 66, utilizing an Ethernet Local Area Network (LAN) 82 (FIG. 4). Each of the supervision system 80, induction station control 64, and sortation control 66 includes a Model 486 personal computer 84 and network interface card 86 for interfacing with network 82, both of which are commercially available from numerous sources. A strict real-time multi-tasking operating system is utilized in induction station control computer 84. Induction control 64 and sortation control 66 each additionally include a serial board 88 to provide serial interface with various devices and a remote interface card 90 to provide interface with a main sortation electrical distribution cabinet 92, remote sortation modules 94, each induction station 26, encoder 76, a cell activation command module, or converter, 100, and a carrier test station 96. Both induction control 64 and sortation control 66 run the iRMX for Windows Operating System commercially available from Intel Corporation, of Hillsboro, Oreg. Supervision system 80 runs InTouch 4 by WonderWare, an object-oriented hierarchical man-machine interface running on Windows 3.1 Operating System available from Microsoft Corporation of Bellevue, Wash. Both induction control 64 and sortation control 66 are network-configured as both server and client at the same time. Supervision system 80 is network-configured as a client. Applications running on control system 78 communicate with each other using Transmission Control Protocol/Internet Protocol (TCP/IP). Control system 78 additionally interfaces with a customer host computer 98 over network 82 to provide system management information exchange with the customer's computer system.

Encoder 76, which includes a set of photo-detectors which read a unique series of reflectors on each transport unit 32, provides to sortation control 66 the actual position of each transport unit 32. Based upon this information, sortation control 66 transmits activation commands to the transport units to control actuation of the carrier belts 36 (FIG. 6). The servo drive control 101 and drive means 38 for driving the carrier belt 36 of each transport unit 32 are grouped together in groups of up to eight transport units (only six of which are shown) under the intermediate control of a decoder 102. Decoder 102 is installed on a master transport unit of the group and receives control data over a data bus 106. Power is distributed to the transport units in the group from a power bus 104. Power bus 104 and data bus 106 are portions of insulated bus 45 positioned within conveying path 30 and are interfaced with pickup shoe assemblies 47 mounted on the master transport unit. Based on the actual position of each transport unit sortation as monitored by encoder 76, control 66 produces activation commands. The activation commands are converted by converter 100 from serial format and applied to dam bus 106. Decoder 102 analyzes the data in order to determine commands which are relevant to the group of cells under the control of the particular decoder 102. Decoder 102 provides information to activate a particular transport unit 32 over output lines 108a, 108b . . . 108n. Decoder 102 transmits digital signals over outputs 108a–108n to the servo drive 101a–108n of the respective transport unit 32. Each message conveyed from sorter control 66 to decoder 102 includes the following information:

Decoder address,

Synchronization byte,

Cell activation profile number,

Command code.

Figure 16:
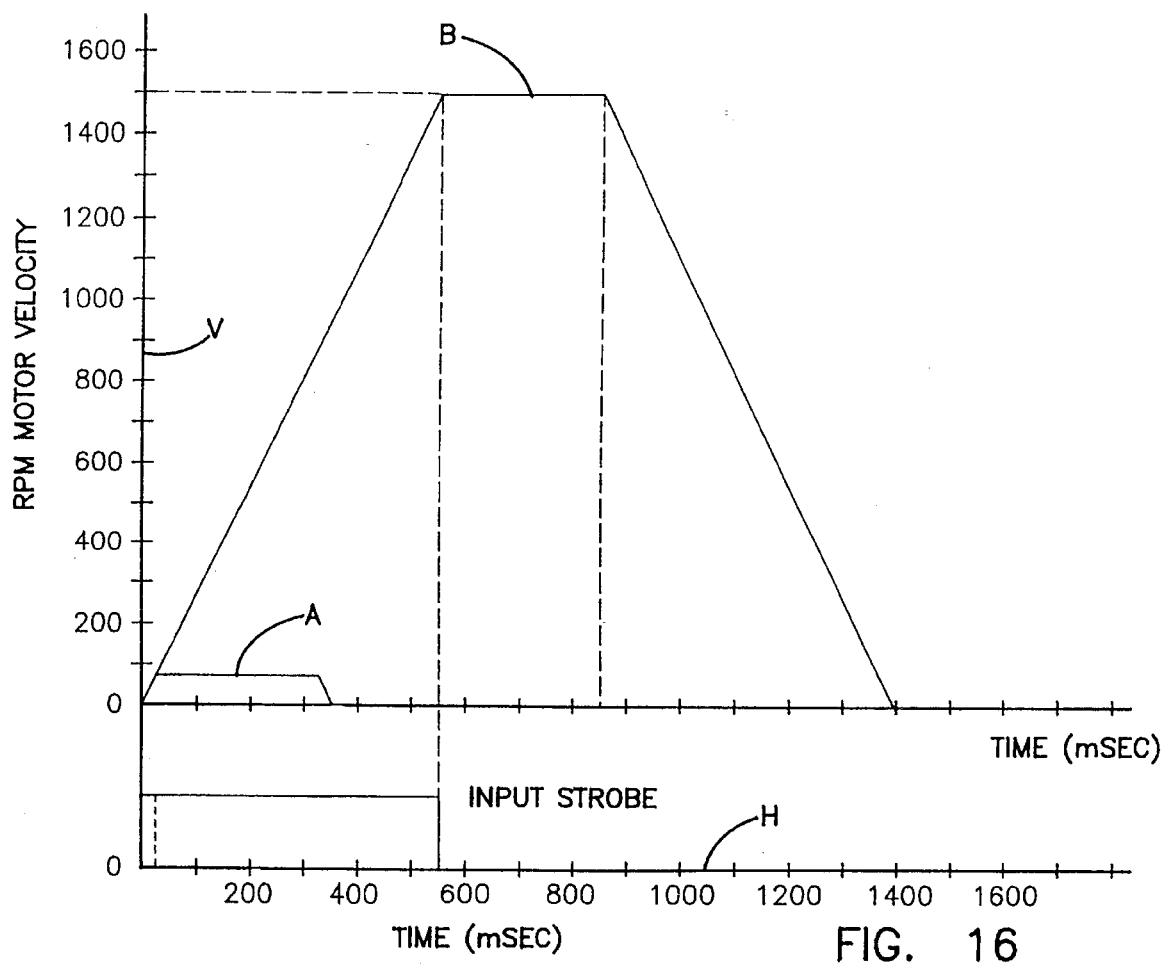
FIG. 16 is a velocity diagram illustrating a family of velocity profile curves for the carrier belt drive means, which may be digitally selected.

The cell activation profile number is a digital number that defines a velocity profile for the particular transport unit carrier belt. The velocity profile is implemented by servo drive unit 101a–101n according to the synchronization byte. The command code includes a set state or a clear state. The clear state cancels previous commands. By reference to FIG. 16, rpm velocity for drive means 38 is charted on axis V with respect to an activation profile number on axis H. By way of example, a profile number that corresponds to an activation time of 25 m/sec in the example illustrated in FIG. 16 will result in velocity profile A. In contrast, a velocity profile number that corresponds to an activation time of 550 m/sec will result in the maximum velocity profile B illustrated in FIG. 16. The area under each curve represents the displacement of the belt. In the illustrated embodiment, the sortation control includes up to 64 possible velocity profiles: 45 constant acceleration and deceleration profiles and 19 profiles that either have a composite acceleration and deceleration profile or an acceleration/deceleration value that is different from that illustrated in FIG. 16. The velocity profile is selected on the basis of a parcel identification number, which allows consideration of the characteristics of the parcel, as well as the parcel weight and volume. In this manner, the system is adaptive to the individual parcels being handled.

Figure 15:
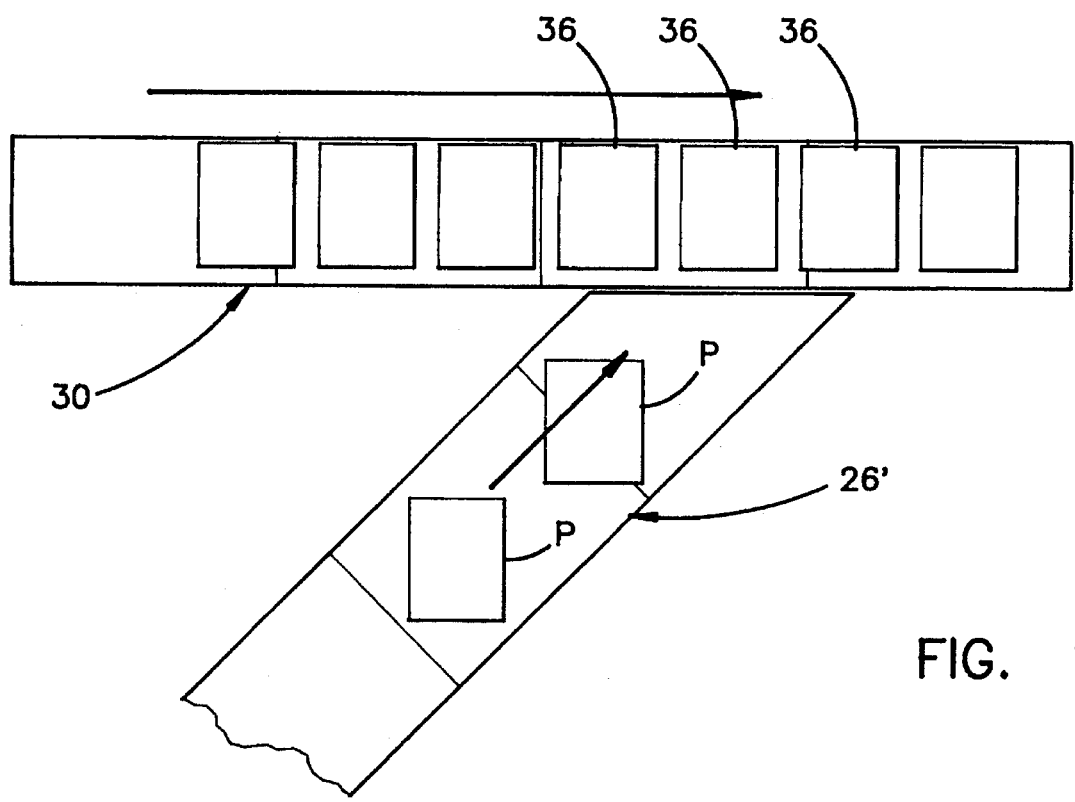
FIG. 15 is the same view as FIG. 7 of an alternative embodiment of an induction station.

Induction control 64 operates the three induction stations 26 illustrated in FIG. 1 through remote I/O modules 90. In addition to controlling the movement of belts 62a–62d, the induction control 64 monitors parcel sensor 68 in order to determine parcel lateral position on the induction belt and calculate parcel dimension. When a parcel is received in induction station 26 on coding or start/stop belt 62a, induction control 64 awaits item codification. The parcel is then transferred to buffer belt 62b while induction control 64 monitors sensor 68 and calculates the parcel position from a lateral edge of the belt, as well as parcel length and parcel width. If another parcel is on synchronization belt 62c awaiting loading onto one or more transport units 32, buffer belt 62b is stopped until the parcel on the synchronization belt is loaded. When a parcel is transferred to synchronization belt 62, the induction control books one or two transport units, depending upon the length of the parcel. While the induction control awaits notification from loadability photosensor 37 that the booked transport unit(s) is (are) approaching the induction station has (have) arrived at a Synchronization Point, shown in FIG. 7, induction control 64 performs calculations in order to establish the location of a loading synchronization point on the basis of the parcel length and position. When the booked cell(s) arrive(s) at the synchronization point, induction control 64 activates synchronization belt 62c, loading belt 62d, and the drive means for the carrier belt of one or both of the booked transport units for that parcel in a manner which will be described below. If only short parcels are to be loaded, an induction station 26' may be used to load packages that are pre-oriented, as illustrated in FIG. 15.

Figure 8:
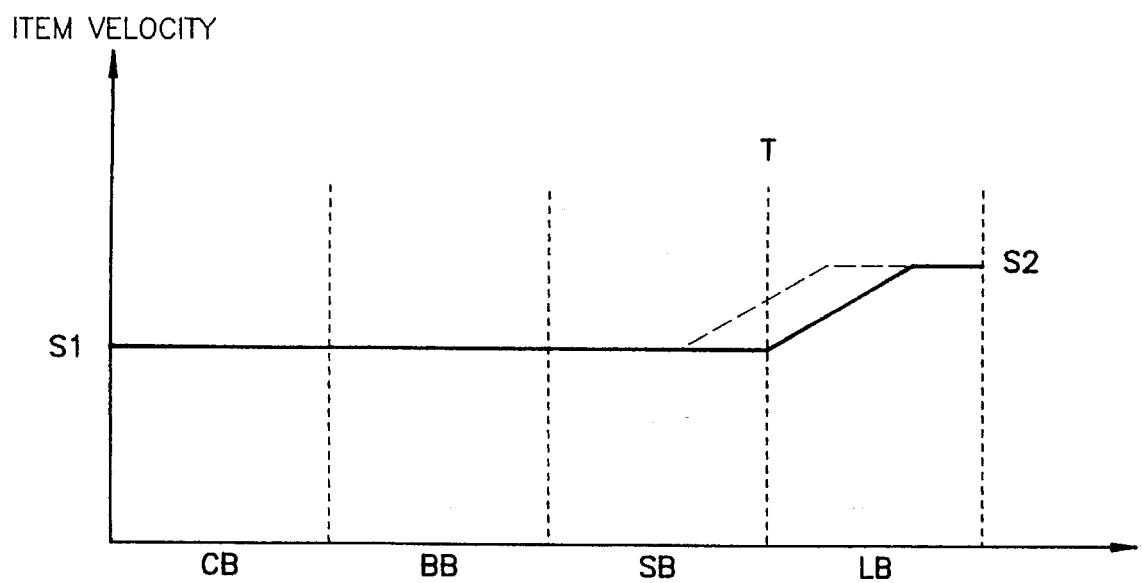
FIG. 8 is a velocity diagram of induction station belts.

When the booked transport unit or units arrive at the synchronization point, synchronization belt 62c is operated at speed $S_1$ until the leading edge of the parcel reaches transition point T with loading belt 62d (FIG. 8). At that point, both the synchronization belt and loading belt are accelerated to speed $S_2$, which is the loading speed for loading the parcel onto one or two transport units. After the parcel is fully past transition T, synchronization belt 62c is decelerated back to speed $S_1$ in order to await receipt of the next parcel from buffer belt 62b. If a parcel is to be loaded onto a single transport unit, the carrier belt 36 of the booked transport unit is actuated while the parcel is being loaded from loading belt 62d. The loading speed of the parcel is determined exclusively by the speed of loading belt 62d. Because of a slight elevation offset between loading belt 62d and the carrier belt 36 of the booked transport unit, the carrier belt takes over control of the movement of the parcel only after the parcel is substantially fully loaded onto the transport unit. The speed of the carrier belt is limited to such speed that will allow the carrier belt to be decelerated to zero velocity without producing undo forces on the parcel. Accordingly, the maximum velocity profile of the carrier belt is provided to the sortation control 66, from the induction control 64, as a function of the parcel size.

Figure 9:
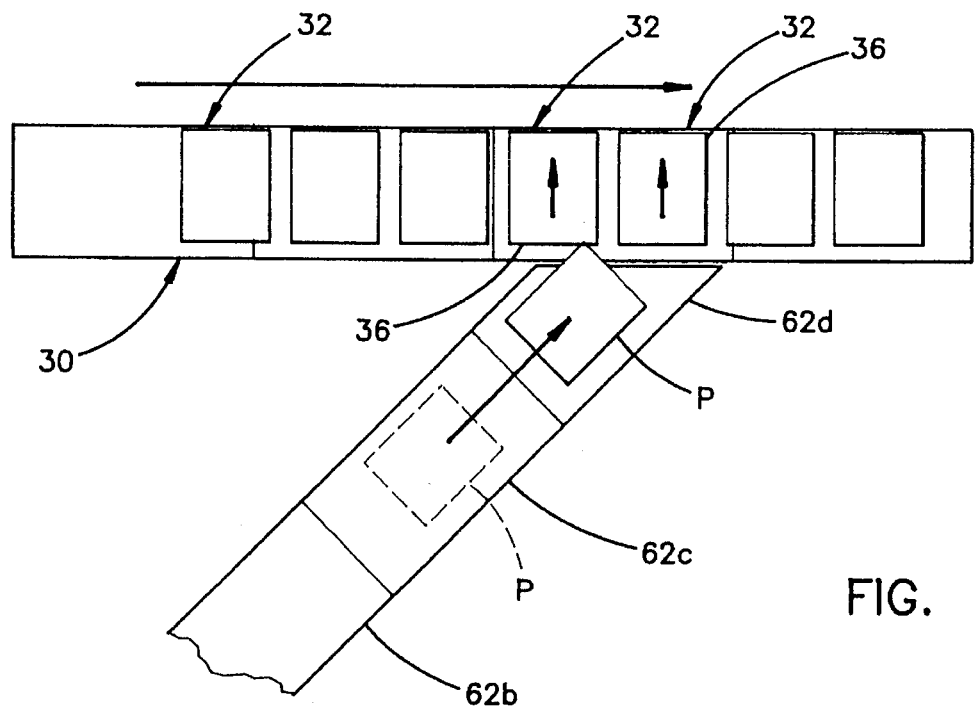
FIG. 9 is the same view as FIG. 7 illustrating the initial loading of a long parcel onto two contiguous transport units.
Figure 10:
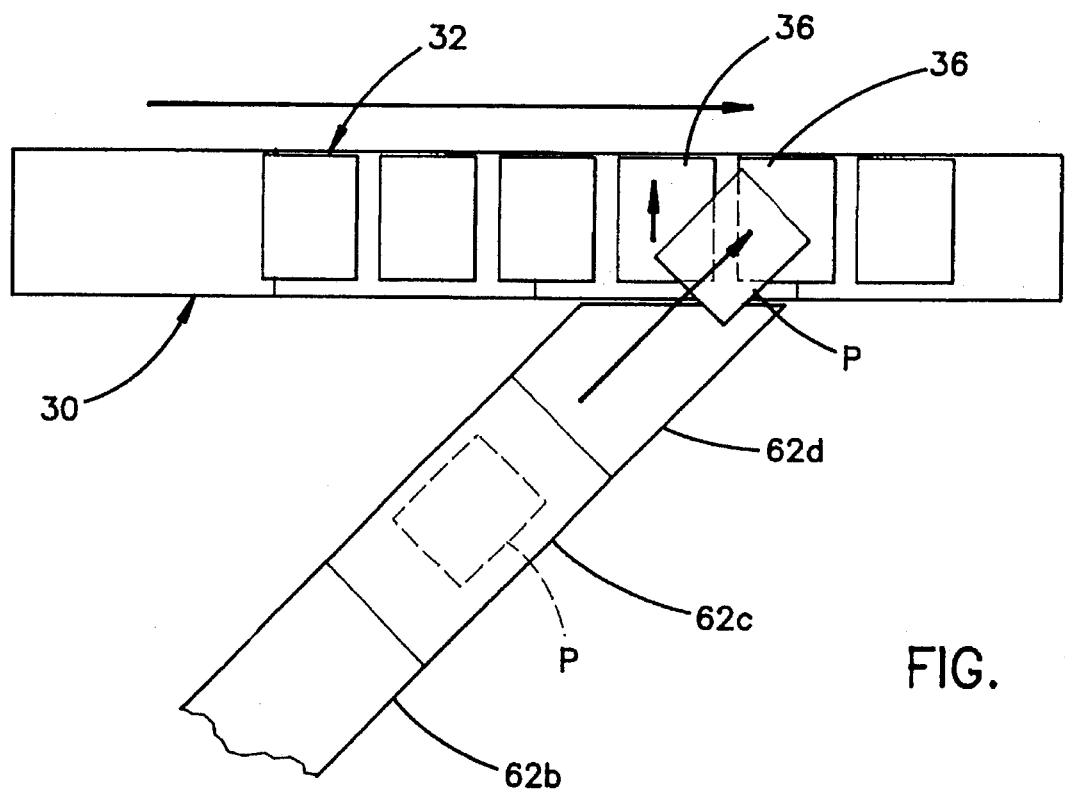
FIG. 10 is the same view as FIG. 9 illustrating a rotation of the parcel onto the two transport units.
Figure 11:
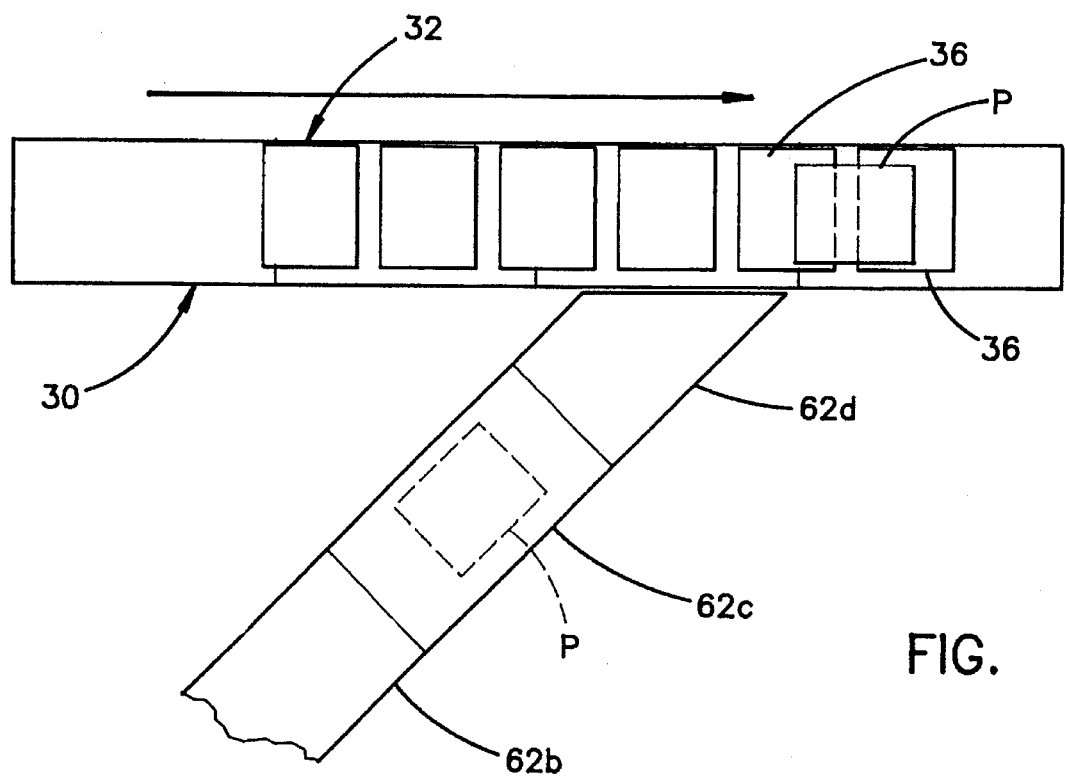
FIG. 11 is the same view as FIGS. 9 and 10 illustrating a long parcel loaded onto two transport units.

When induction control 64 determines that a parcel has a length that is greater than a predetermined length, induction control 64 reserves two contiguous transport units to transport the parcel. After the induction control has requested and booked two contiguous transport units, the parcel is loaded onto the two contiguous transport units as follows. Sortation control 66 causes the carrier belts of the two booked transport units to move in the direction illustrated by the arrows in FIG. 9 as the booked units pass the synchronization point. When the leading edge of the parcel reaches the fully loaded position of the leading transport unit, the carrier belt of the leading transport unit is decelerated to zero velocity, as illustrated in FIG. 10. However, the carrier belt of the following transport unit continues to move in order to rotate the parcel as the parcel is loaded onto the following transport unit, as illustrated by comparison of FIGS. 10 and 11.

Figure 22A:
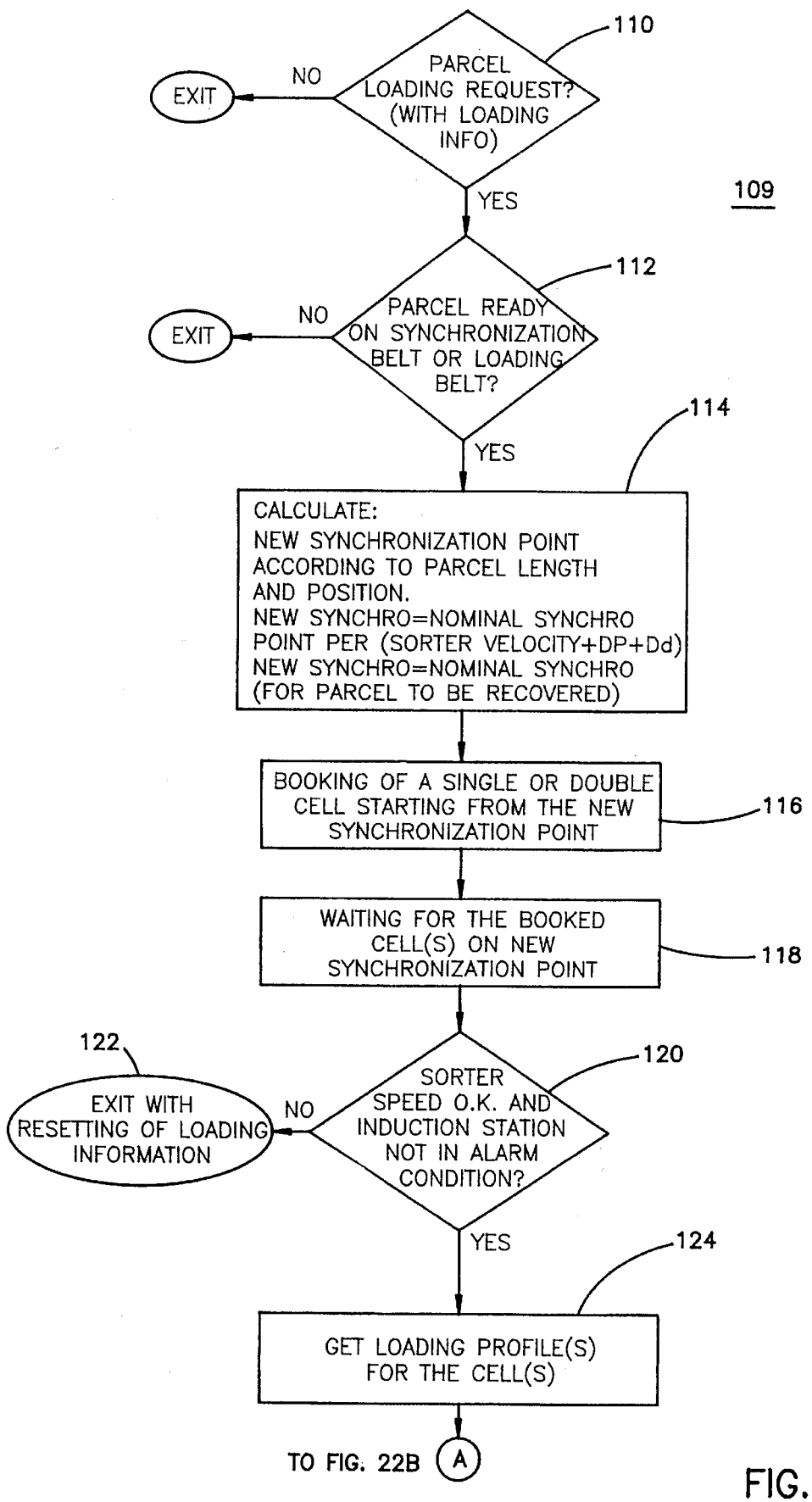
FIGS. 22a and 22b are a flowchart of an induction control function, according to the invention.
Figure 22B:
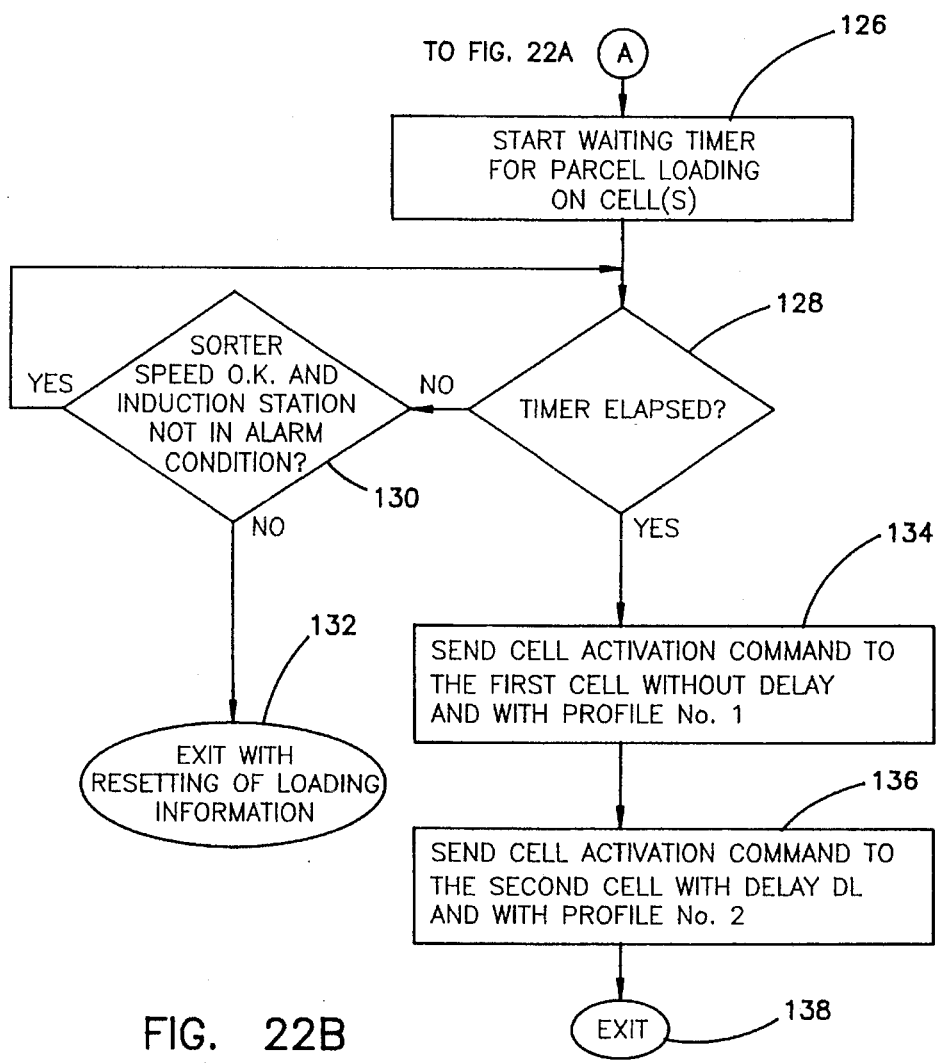
Figure 23:
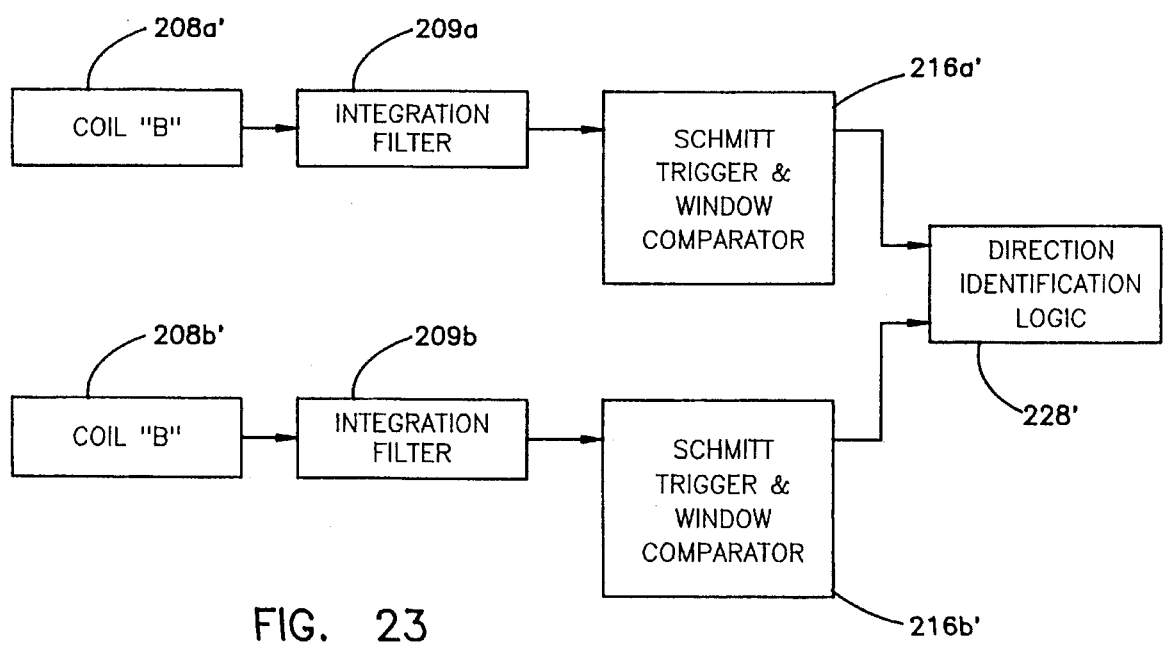
FIG. 23 is a block diagram of an alternative electrical test circuit for the test station in FIGS. 17a–17c.

A loading of parcel routine 109 at parcel induction station 26, under the control of induction control 64, is explained in greater detail with reference to FIGS. 22a and 22b. When a parcel reaches the buffer belt 62b, induction control 64 determines at 110 whether a request for loading is received from the operator. At the same time, the induction control determines the position of the parcel, the parcel length and width, whether a single or double cell is to be reserved, and whether the parcel will be loaded from the loading belt 62d, which may occur when the sortation system 25 is recovering from a power interruption, or the like. The routine then determines at 112 whether the parcel is ready for loading on the synchronization belt or, if loading is to occur from the loading belt, that it is on the loading belt. While awaiting loading, the induction control calculates at 114 a new Synchronization Point as a function of the velocity of transport units along the conveying path and two variables, DP and Dd. Variable DP is equal to the sorter velocity times the difference between a sorter time parameter and a belt time parameter minus a parameter, which depends on sorter and loading belt velocity, times the parcel length, as follows:

$$DP=[\text{sorter velocity} \times (\text{sorter time}-\text{belt time})]-[K \times (\text{sorter velocity}/\text{loading belt velocity}) \times \text{parcel length}]$$

The sorter time parameter is defined as the parcel position on the induction belt divided by the cosine of 45° times the sorter velocity. The belt time parameter is defined as the position of the parcel on the induction belt divided by the loading belt velocity. DP is equal to the above for a recover loading also. The parameter Dd is different depending on whether the parcel is to be loaded onto one or two transport units. If loaded onto a single transport unit, Dd is calculated as follows:

$$Dd=0.5 \times \text{cell width}$$

For parcel loading onto two transport units Dd is calculated as follows:

$$Dd=0.5 \times (\text{cell width}+\text{cell pitch})$$

Dd is equal to the above for a recover loading also.

The sortation control 66 books a single or a pair of contiguous transport units at 116 by monitoring loadability photosensor 37 in order to verify unloaded transport units. The induction control then awaits at 118 for the booked cell(s) to arrive at the Synchronization Point. When the cell(s) arrive(s) at the Synchronization Point, it is then determined at 120 whether the speed of the transport unit is satisfactory and that the induction station is not in an alarmed condition. If these conditions are not satisfied, the loading is aborted at 122 and the loading parameters are reset. If the conditions are satisfactory at 120, the induction control calculates the loading profile(s) for the cell(s) at 124. The loading profiles are determined as follows:

Profile #1 for single transport unit=0.5×cell length+(parcel length+ parcel width)×COS 45°

Profile #1 for the leading of double transport unit=0.5×(cell length+parcel width)

Profile #2 for the trailing of double transport unit=cell length

If the parcel is a recover loading to be loaded from the loading belt, profile #1 and profile #2 are equal to the above.

The induction control then starts a waiting-for-parcel-loading timer at 126. The timer is set to a particular value as a function of the velocity of the transport unit combined with the parcel position, divided by the load belt velocity. While the control is awaiting elapsing of the timer at 128, the control repetitively determines at 130 whether the sorter speed remains satisfactory and that the induction station 26 has not entered an alarm condition. If either condition occurs, the loading is aborted at 132 and the loading information is reset. When it is determined at 128 that the waiting timer has elapsed, a cell activation command is sent at 134, through sortation control 66, to the first transport unit along with profile #1. After a delay, the cell activation command is then sent at 136 along with profile #2 for the trailing transport unit, if any. The program is exited at 138 until the next parcel enters the buffer belt.

Figure 13:
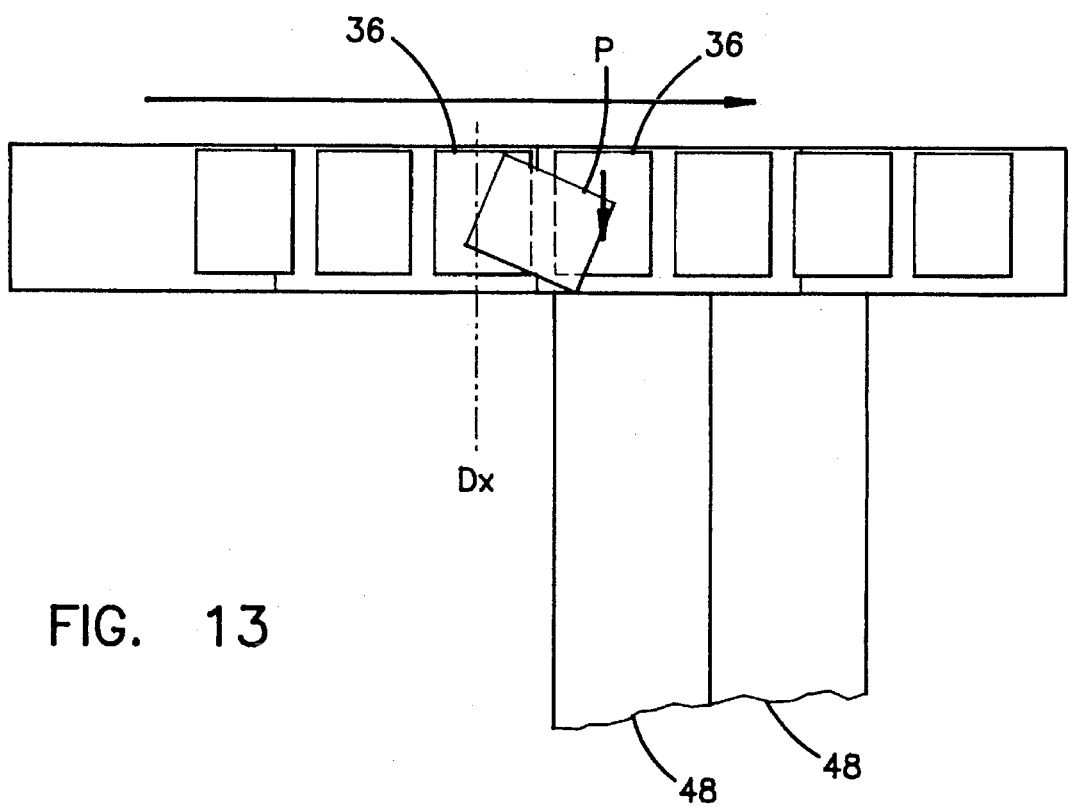
FIG. 13 is the same view as FIG. 12 illustrating the rotation of a long parcel being discharged from two transport units.
Figure 14:
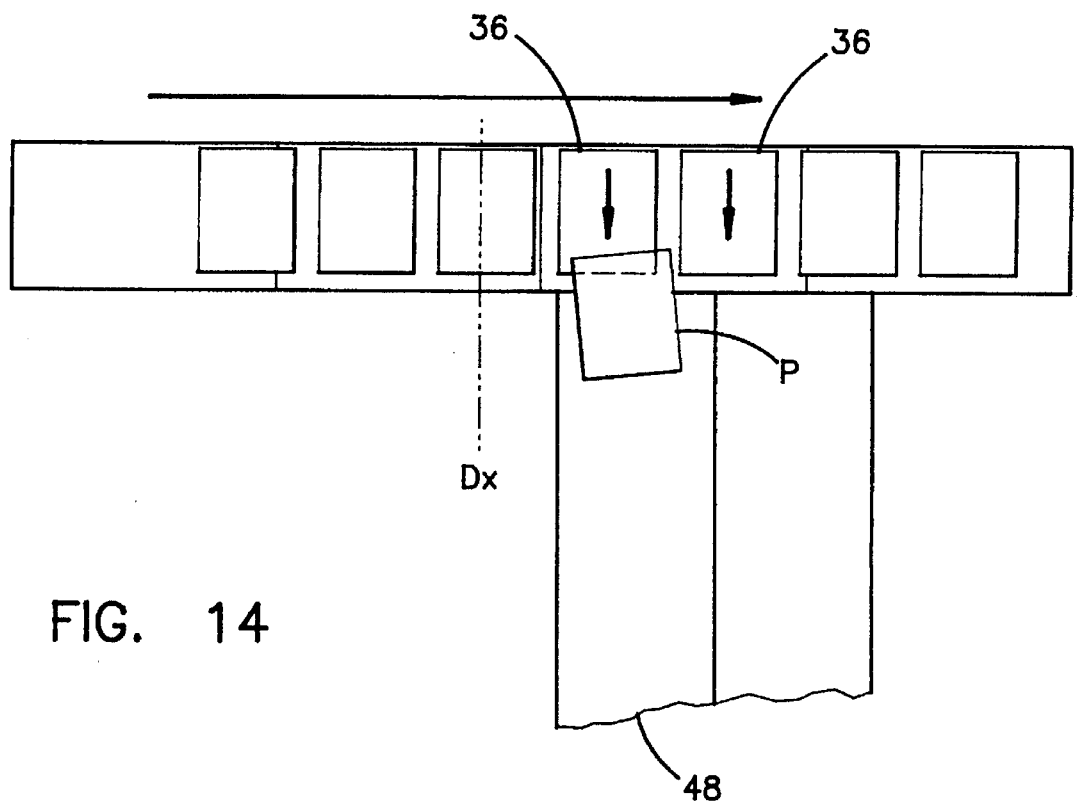
FIG. 14 is the same view as FIGS. 12 and 13 illustrating the completion of discharge of a long parcel conveyed by two transport units.

In order to discharge a parcel at discharge station 28 into a chute 48, the carrier belt(s) of the transport unit(s) carrying the parcel is (are) activated at appropriate time(s) in order to discharge the parcel without modifying the speed of the transport unit(s). If the parcel is carried by two contiguous transport units 32, the package is rotated while it is discharged. By reference to FIG. 12, when the leading edge of the parcel arrives at a fixed location $D_x$, the carrier belt of the lead transport unit is activated according to a particular velocity profile. The carrier belt of the trailing contiguous transport unit, if any, carrying the parcel is arrested. This causes a rotation of the parcel as may be seen by comparing FIGS. 12 and 13. When the trailing transport unit arrives at point $D_x$, the carrier belt for the trailing transport unit is actuated according to a particular velocity profile. This results in completion of the rotation of the parcel as the parcel is discharged to the designated chute 48, as seen in FIG. 14. In this manner, the width, not the length, of the parcel determines the width of the chute. Therefore, parcels of relatively greater length may be handled by sortation system 25 without adding to the width of chute 48.

Figure 21A:
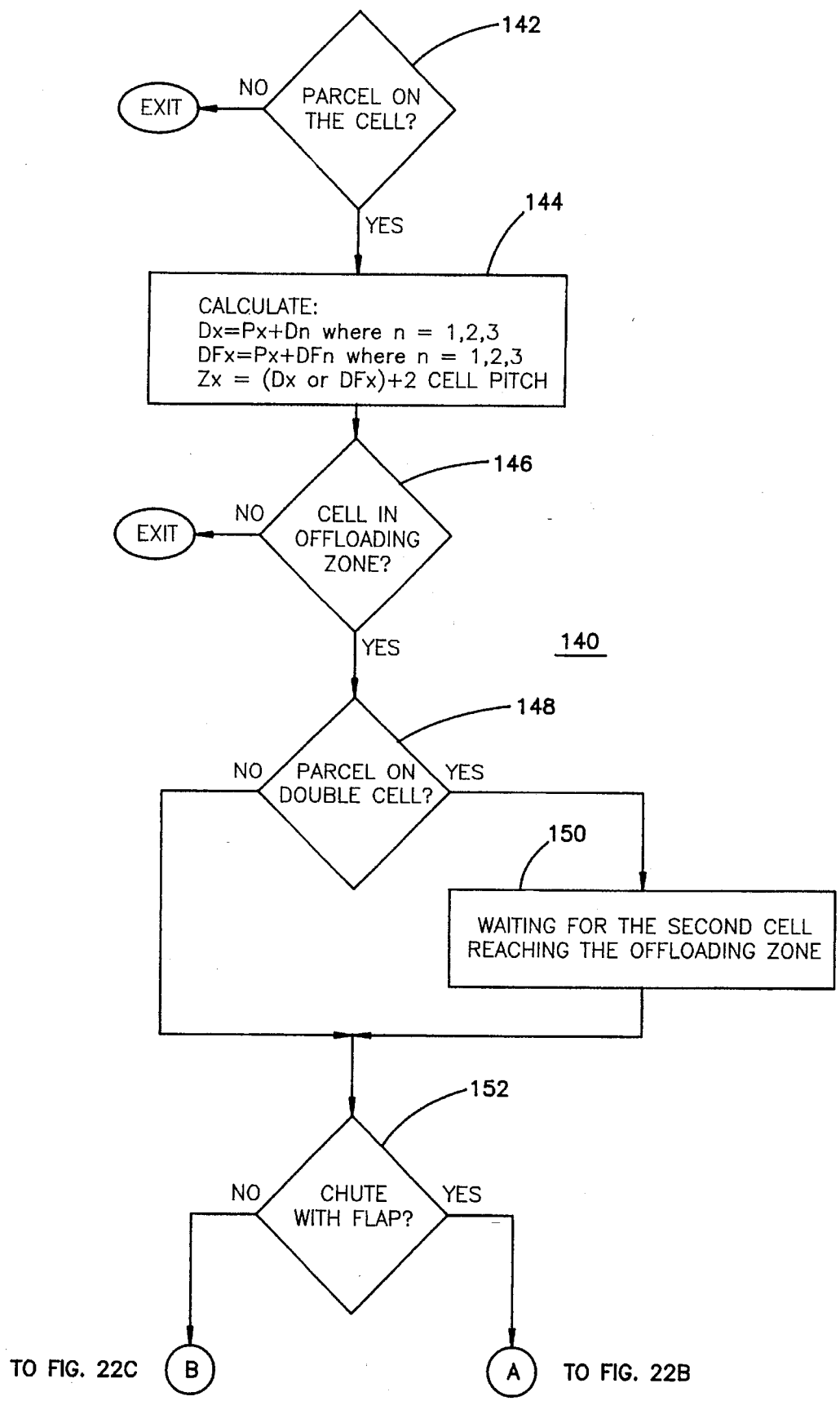
FIGS. 21a–21c are a flowchart of a sortation control function, according to the invention.
Figure 21B:
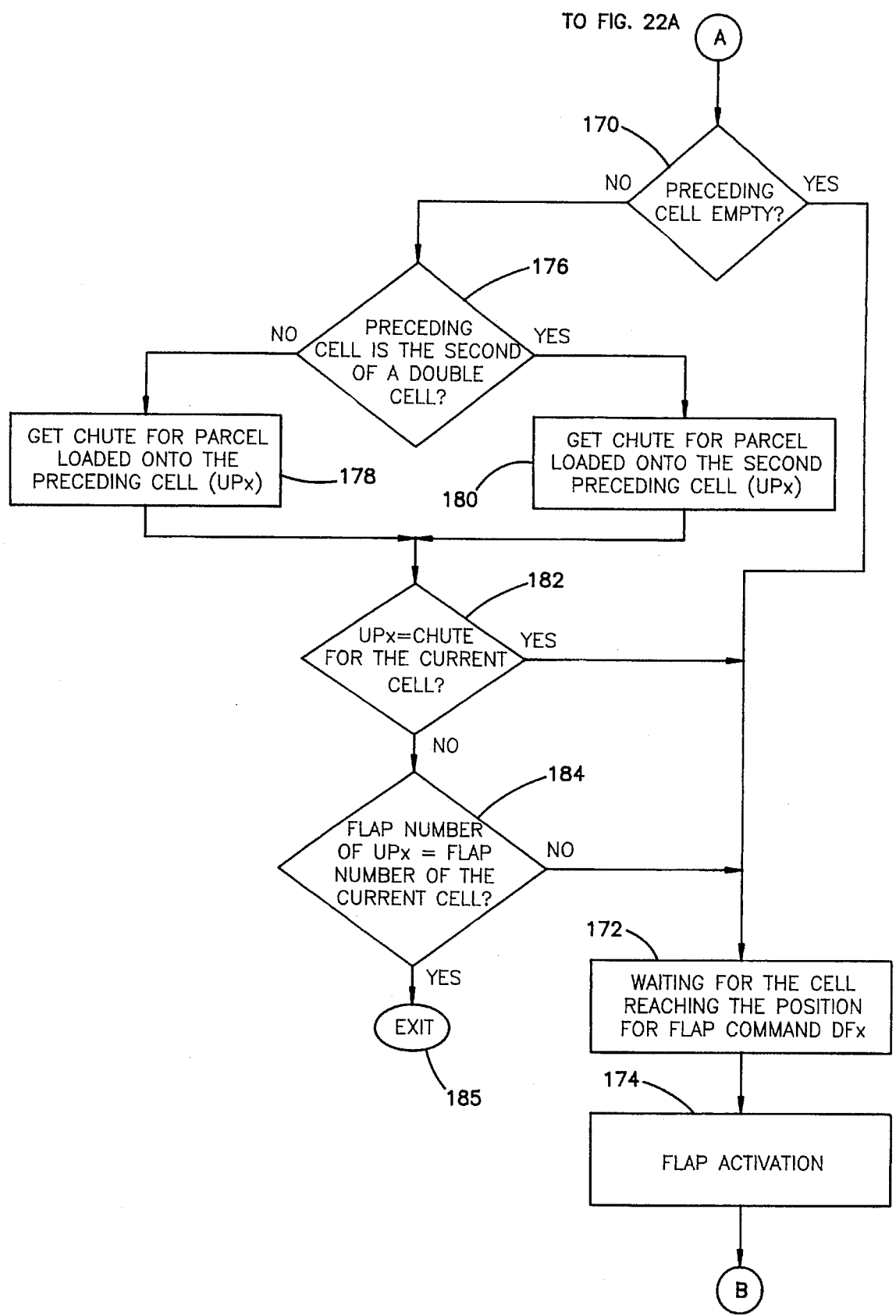
Figure 21C:
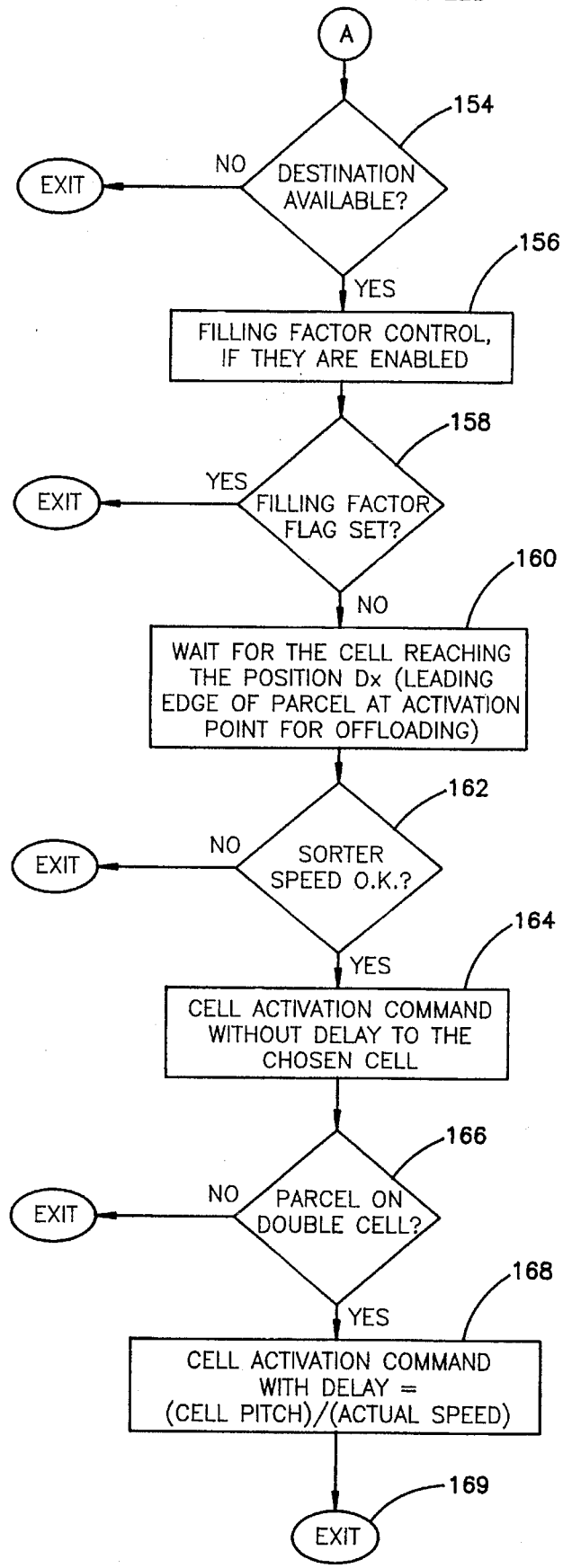

In order to discharge a parcel to a chosen chute 48, a discharge routine 140 is performed (FIGS. 21a–21c). The routine first determines at 142 whether there is a parcel on a transport unit 42 entering the discharge station 28. If not, the routine is exited and this procedure is repeated until a parcel appears on a transport unit entering the discharge station. The routine then calculates at 144 the parameters of $D_x$, $DF_x$, and $Z_x$. The parameter $D_x$ is calculated as the sum of $P_x$, which is the distance between the leading edge of the cell and the leading edge of the parcel, and a distance $D_n$, which is pre-established for each of the three transport unit speeds. Likewise, the parameter $DF_x$ is equal to the sum of $P_x$ and a distance $DF_n$, which is pre-established for each of the three transport unit speeds. The parameter $Z_x$ is an off-loading zone coordinate, which begins two cell pitches before the activation point for the selected discharge port. The cell pitch is in the centerline-to-centerline spacing of the transport units. $Z_x$ is equal to the sum of either $D_x$ or $DF_x$ and twice the cell pitch.

The control then determines at 146 whether the loaded transport unit has arrived in the off-loading zone defined by the parameter $Z_x$. If not, the routine is exited awaiting the arrival of the transport unit into the off-loading zone. When the loaded transport unit arrives at the off-loading zone, it is then determined at 148 whether the parcel is loaded on one transport unit or two transport units. If it is determined at 148 that the parcel is loaded on two transport units, the routine enters a delay function 150 in which the arrival of the second transport unit is awaited at the off-loading zone.

Figure 12:
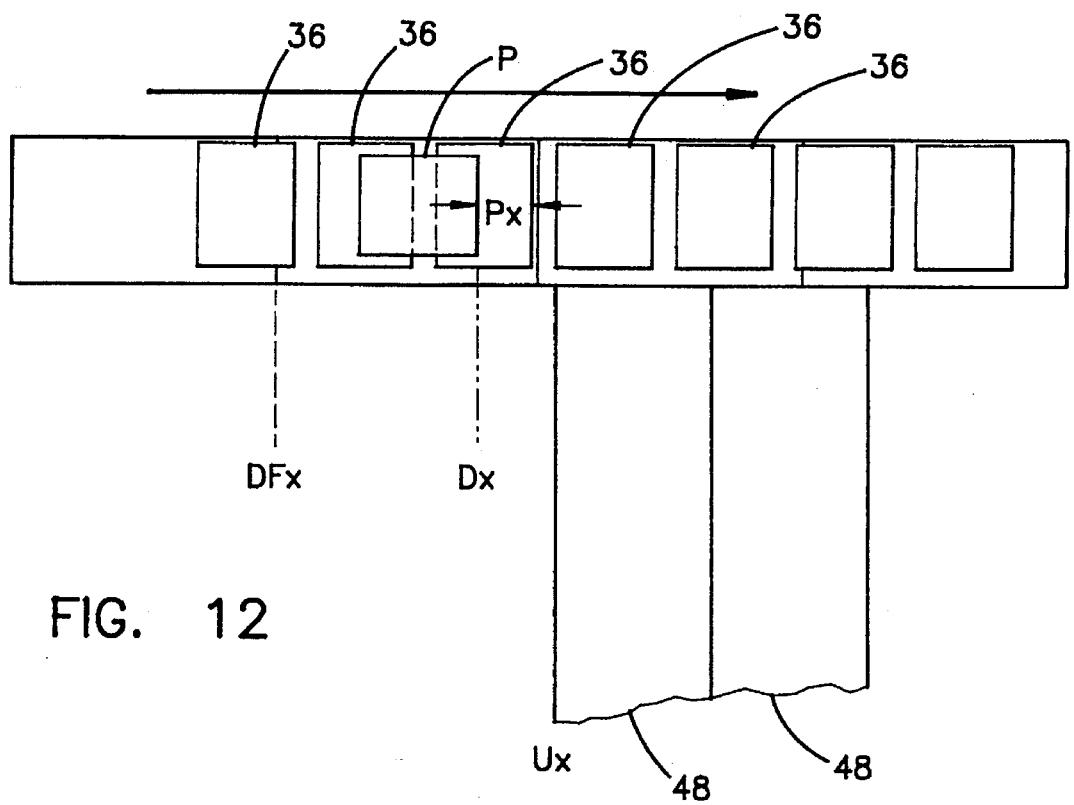
FIG. 12 is a top plan view of a discharge station.

The routine then determines at 152 whether the destination port includes a diverter flap 56. If it is determined at 152 that the destination port does not include a diverter flap, the routine proceeds to FIG. 21c where the carrier belt, or cell, activation function is performed. Routine 140 determines at 154 whether the selected destination port is available. A port is not available if it is full or in not a working order or if it has been disabled by an operator. If the destination port is not available, the discharge is aborted. If the destination is available, then a filling factor control is determined at 156. The filling factor is a predetermined accumulative value to indicate the degree of filling the destination port and may be expressed in weight, volume, or quantity units. It is then determined at 158 whether the filling factor flag is set. If it is, then the discharge is aborted and the routine is exited. If it is determined at 158 that the filling factor flag is not set, then the routine awaits the leading edge of the parcel reaching the fixed location $D_x$ at 160 (FIG. 12). When the leading edge of the parcel arrives at fixed location $D_x$, the sorter speed is checked at 162. If it is incorrect, then the discharge is aborted and the routine is exited. If the sorter speed is okay, a cell activation command is given to the chosen transport unit at 164. If it is determined at 166 that the parcel is loaded on two contiguous transport units, a cell activation command is given to the following of the two transport units after a suitable delay, the delay being equal to the cell pitch divided by the actual speed of the transport unit. The discharge is then completed and the routine is exited at 169.

If it is determined at 152 that the destination port includes a diverter flap 56, it is then determined at 170 whether the transport unit preceding the transport unit under control is empty (FIG. 21b). If it is empty, then a delay routine is entered at 172 wherein the arrival of the transport unit under control is awaited at the flap command location point $DF_x$. When the leading edge of the parcel arrives at location $DF_x$, the flap is actuated at 174. If it is determined at 170 that the transport unit preceding the transport unit under control is not empty, then it is determined at 176 whether the preceding transport unit is the trailing of a pair of contiguous transport units transporting a parcel. If it is, then the destination port for the second preceding transport unit is obtained at 180. If the preceding transport unit is not the trailing of a double cell, then the destination port for the parcel loaded on the preceding transport unit is obtained at 178. The control then determines at 182 when the value of $UP_x$ is equal to the destination port for the current transport unit. When it is equal, the actuation of the flap (172, 174) is carried out. When it is determined at 182 that the transport unit under control is not at the selected destination port, the routine determines at 184 whether the flap position designation of the selected destination port is equal to the flap position designated for the transport unit under control. If it is, then off-loading of the parcel to the selected destination port is not possible and the routine is exited at 185. If it is determined at 184 that the flap designation of the selected designation port does not equal the flap designation of the transport unit under control, the flap activation (172, 174) is carried out. The parcel discharge functions (154–169) are then carried out.

Figure 17A:
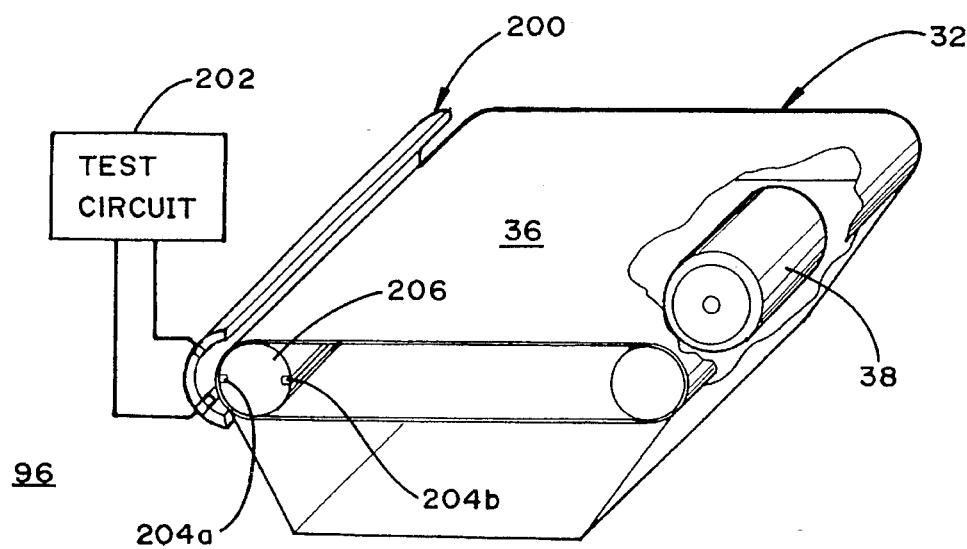
FIG. 17a is a perspective view of a test station juxtaposed with a transport unit undergoing tests.

Carrier test station 96 is provided for the purpose of verifying the complete functionality of each of the transport units 32. Carrier test station 96 tests the functionality of servo drive 101a–101n, drive means 38a–38n, and cog belt 41. Transport unit test station 96 includes a sensor 200 and a test circuit 202, which respond to magnetic fields produced by a pair of bar magnets 204a, 204b positioned within pulley 206 of each transport unit 32 (FIGS. 17a–20). Pulley 206 is either the drive pulley or the idler pulley supporting carrier belt 36. In this manner, pulley 206 rotates at a rate that is proportionate to the linear speed of belt 36 under the control of servo drive 101a–101n and drive means 38a–38n. Sensor 200 includes a pair of magnetic-field responsive devices, such as Hall-effect cells 208a, 208b, which are coupled with a magnetic antenna 210. Magnetic antenna 210 includes a first pole shoe 212 and a second pole shoe 214, which are elongated in the direction of movement of carrier unit 32 along conveying path 30. Each pole shoe is made from a ferromagnetic material. Pole shoes 212 and 214 are coupled with Hall-effect cells 208a, 208b in a manner that the pole shoes are galvanically isolated by the Hall-effect cells. As best seen in FIG. 17b, sensor 200 is curved to correspond to the circular profile of pulley 206 such that Hall-effect cells 208a and 208b are radially offset with respect to the rotation of magnets 204a and 204b.

Figure 19:
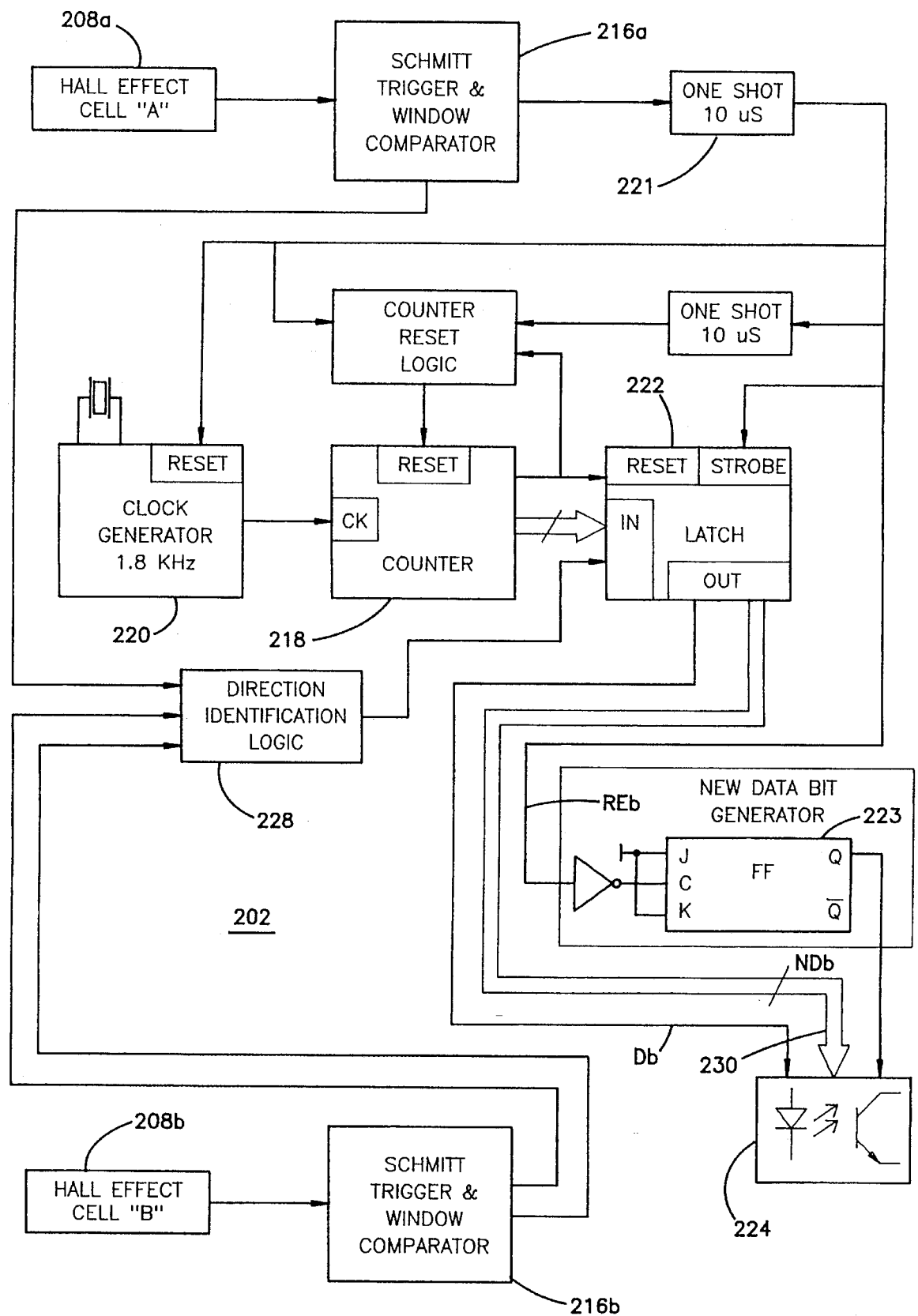
FIG. 19 is a block diagram of an electrical test circuit for the test station in FIGS. 17a–17c.
Figure 20:
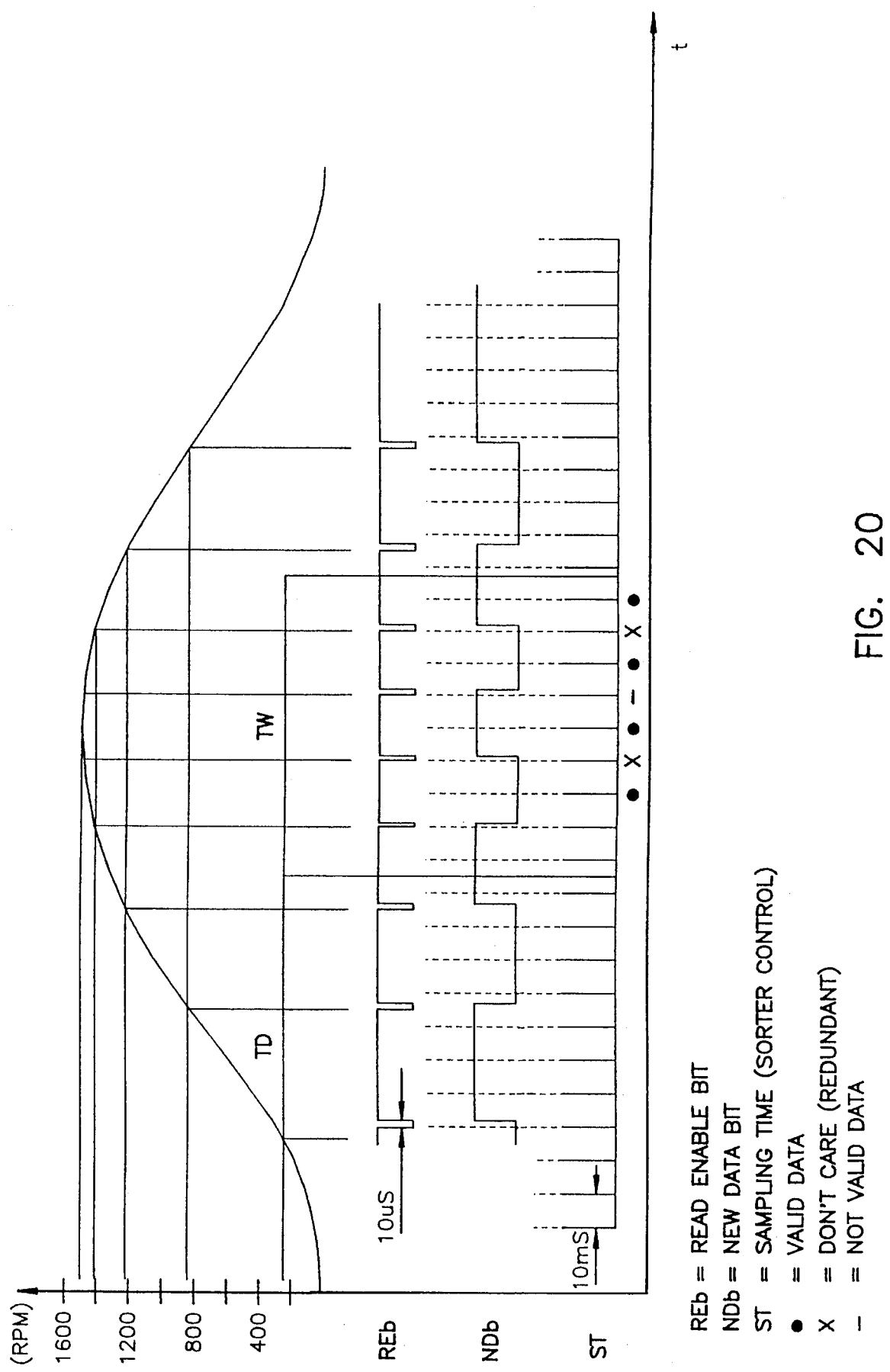
FIG. 20 is a speed diagram illustrating the relationship of the output signals of the circuit in FIG. 19 for various carrier belt speeds.

Each Hall-effect cell 208a, 208b is connected with a Schmidt Trigger 216a, 216b in order to produce a digital output in response to variation in the input signal caused by the proximity of a magnet 204a, 204b (FIG. 19). The time between variation for one signal cycle is equivalent to the time for the pulley 206 to make a one-half rotation. Therefore, by measuring the signal cycle time, the velocity of the pulley and, hence, carrier belt 36, may be measured. A counter 218 supplied from a clock generator 220 measures the pulley speed. The measurement in counter 218 is stored in a latch 222 and reset for a new calculation. A Read Enable bit (REb) is produced by a mono-stable multi-vibrator 221 from the output of Schmidt Trigger 216a. The Read Enable bit is supplied as an input to a New Data bit generator 223. New Data bit generator 223 produces a New Data bit (NDb) that is set to zero during data accumulation in order to indicate that the data is not available. A directional bit (Db) outputted by latch 222 has a value corresponding to the direction of rotation of pulley 206. Test circuit 202 is sensitive to the signal transitions illustrated in FIG. 18. If the transition from $A^-$ to $A^+$ is immediately followed by a transition from $B^-$ to $B^+$, the pulley is turning clockwise. If there is, instead, a variation from $B^+$ to $B^-$, the sense of rotation is counterclockwise. The rotation direction is determined by a direction identification logic circuit 228. A digital velocity output number is provided on output bus 230. The output signals are optically coupled at 224, as illustrated in FIG. 19, for interface with sortation control I/O card 90. FIG. 20 illustrates the timing sequence between the Read Enable bit ($RE_b$) and the availability of the New Data bit ($ND_b$) for various rotational velocities of drive means 38.

The carrier test station 96 produces reliable digital data that is not adversely affected by the velocity of bar magnets 204a, 204b and, therefore, by the rotational speed of pulley 206. This is accomplished by unique sensor 200, which includes a combination of Hall-effect cells and ferromagnetic pole shoes. This attribute substantially eliminates the requirement for circuit calibration while producing a digital output that is compatible with personal computer and programmable logic control interfaces. Furthermore, carrier test station 96 is capable of determining not only carrier belt velocity but also direction of movement. Although the invention is illustrated with a pair of magnets 204a, 204b, it is only necessary that one magnet be present. The other magnet could be replaced by a counterweight.

In an alternative embodiment, a test circuit 202' includes the magnetic-field sensitive devices which are composed of a pair of inductive pick-up coils 208a', 208b'. The rotating magnets 204a, 204b induce a voltage in each coil 208a', 208b', which is integrated by respective integration filters 209a, 209b in order to obtain a square wave signal. The outputs of integration filters 209a, 209b are supplied, respectively, to Schmidt Trigger circuits 216a', 216b' from which the signals are processed as previously described with respect to test circuit 202.

Thus, it is seen that the present invention provides an exceptionally adaptable crossbelt sortation system that is capable of handling parcels of dimensions that are significantly larger than the capabilities of the prior art. This is accomplished in a manner which does not increase the component size of the system. In this manner, the invention is not only adaptable but is also compact. The invention eliminates the necessity for pre-orientation of parcels by measuring and compensating for variations in parcel lateral displacement and orientation on the induction belts. Because transport units are "booked" for a particular parcel much further upstream on the induction belts than known systems, system capacity is improved because fewer no-load empty transport units will remain after the induction station. Because long parcels, which are loaded onto two contiguous transport units, are rotated into alignment on the transport units, the necessity for wide induction belts and pre-orientation are eliminated. Packages are discharged to receiving ports in an accurate manner. Therefore, the chutes associated with each receiving port may be reduced in width, contributing to the overall system compactness and cost effectiveness. Because long parcels carried on two contiguous transport units are rotated as a result of the unique operation of the carrier belts of the transport units during parcel discharge, there is no requirement for an increase in chute width in order to handle the extra length packages.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. A method of conveying parcels on a plurality of transport units moving in a conveying path between an induction station and a discharge station, each transport unit having a driven carrier belt thereon which is moveable orthogonally to the conveying path, said induction station having at least one induction belt extending at an angle to the conveying path, said discharge station having a plurality of receiving ports positioned along said conveying path, including:

determining the length of parcels at said induction station;

for parcels having a length less than a given length operating said at least one induction belt and said carrier belt of one of said transport units to position a parcel on said one of said transport units; and for parcels having a length greater than said given length operating said at least one induction belt and said carrier belts of at least two contiguous transport units in order to position a parcel on said at least two transport units.

2. The method of claim 1 including operating said carrier belts of said at least two transport units in a manner that rotates parcels having a length greater than said given length to position the parcel on said at least two transport units.

3. The method of claim 2 wherein said manner that rotates parcels includes operating said carrier belts of said at least two transport units until a parcel is positioned over the leading one of said at least two transport units and stopping said carrier belt of said leading one of said at least two transport units while operating said carrier belts of at least one following one of said at least two transport units until the parcel is positioned on said at least two transport units.

4. The method of claim 1 wherein operating said at least one induction belt includes determining the availability of at least one carrier unit and accelerating a parcel on said at least one induction belt to a loading speed according to a fixed velocity profile upon the availability of at least one carrier unit.

5. The method of claim 4 wherein said accelerating is initiated as a function of at least the length and width of said parcel.

6. The method of claim 1 wherein said determining includes measuring the length of parcels on said induction belts.

7. The method of claim 1 including discharging said parcels to selected ones of said ports.

8. The method of claim 7 wherein said discharging includes rotating parcels that are positioned on at least two of said transport units while discharging said parcels that are positioned on at least two of said transport units.

9. The method of claim 8 wherein said rotating includes operating the carrier belt of a forward one of said at least two transport units while not operating the carrier belt of at least one trailing one of said at least two transport units.

10. The method of claim 9 including operating said carrier belt of said at least one trailing one of said transport units after a time delay.

11. The method of claim 10 wherein said operating of said carrier belts of both said forward one and said at least one trailing one of said at least two transport units is initiated at the same fixed location with respect to the selected one of said ports.

12. The method of claim 9 wherein said operating said carrier belt of said forward one of said at least two transport units is initiated as a function of the distance of the leading edge of the parcel on said carrier belt of said forward one of said at least two transport units frown the selected one of said ports.

13. The method of claim 12 wherein said operating said carrier belt of said forward one of said at least two transport units is initiated as a function of the distance of said forward one of said at least two transport units from the selected one of said ports and the distance of said leading edge of the parcel from a leading edge of said forward one of said at least two transport units.

14. The method of claim 7 wherein said discharging includes operating the carrier belt of the at least one of said transport units conveying a parcel as a function of the distance of the leading edge of the parcel on said carrier belt of said at least one of said transport units from the selected one of said ports.

15. The method of claim 14 wherein said discharging includes operating the carrier belt of the at least one of said transport units conveying a parcel as a function of the distance of said at least one of said transport units from the selected one of said ports and the distance of said leading edge of the parcel from a leading edge of said at least one of said transport units.

16. The method of claim 7 wherein at least certain ones of said ports are chutes combined in vertical pairs including a flap for directing parcels to one of a pair of chutes and wherein said discharging includes setting the position of said flap.

17. The method of claim 16 including initiating said setting as a function of the distance of the leading edge of the parcel on said carrier belt of said at least one of said transport units from the selected one of said ports.

18. The method of claim 17 including initiating said setting as a function of the distance of said at least one of said transport units from the selected one of said ports and the distance of said leading edge of the parcel from a leading edge of said at least one of said transport units.

19. A crossbelt sortation system comprising:

a plurality of transport units moving in a conveying path between an induction station and a discharge station, each transport unit having a driven carrier belt thereon which is moveable orthogonally to the conveying path;

said discharge station having a plurality of receiving ports positioned along said conveying path; and said induction station having at least one induction belt extending at an angle to the conveying path, a parcel length input device for inputting data indicative of the length of parcels and an induction control that is responsive to said length input device for operating said at least one induction belt and said carrier belts of particular ones of said transport units in a manner that positions a parcel having a length less than a given length on one of said transport units and a parcel having a length greater than said given length on at least two contiguous transport units.

20. The system in claim 19 wherein said induction control operates said carrier belts of said at least two transport units in a manner that rotates parcels having a length greater than said given length to position the parcel on said at least two transport units.

21. The system in claim 20 wherein said induction control rotates parcels by operating said carrier belts of said at least two transport units until a parcel is positioned over the leading one of said at least two transport units and stopping said carrier belt of said leading one of said at least two transport units while operating said carrier belt of at least one following one of said at least two transport units until the parcel is positioned on said at least two transport units.

22. The system in claim 19 wherein said induction control determines the availability of at least one carrier unit and accelerates a parcel on said at least one induction belt to a loading speed according to a fixed velocity profile upon the availability of at least one carrier unit.

23. The system in claim 22 wherein said induction control initiates the acceleration as a function of at least the length and width of said parcel.

24. The system in claim 19 wherein said length input device includes a measuring station that measures the length of parcels on said induction belts.

25. The system in claim 19 wherein said discharge station includes a sortation control that operates said carrier belts in a manner that discharges parcels carded by said transport units to selected ports.

26. The system in claim 25 wherein said sortation control operates said carrier belts of said at least two transport units carrying a parcel in a manner that rotates the parcel carried by said at least two transport units while discharging that parcel.

27. The system in claim 26 wherein said sortation control rotates a parcel carried by said at least two transport units by operating the carrier belt of a forward one of said at least two transport units while not operating the carrier belt of at least one following one of said at least two transport units.

28. The system in claim 27 wherein said sortation control rotates a parcel carried by said at least two transport units by operating the carrier belt of said at least one following one of said transport units after a time delay.

29. The system in claim 28 wherein said sortation control initiates said operating of said carrier belts of both said forward one and said at least one following one of said at least two transport units at a same fixed location with respect to the selected one of said ports.

30. The system in claim 26 wherein said sortation control initiates operating of the carrier belt of said forward one of said at least two transport units as a function of the distance of the leading edge of the parcel on that transport unit from the selected one of said ports.

31. The system in claim 30 wherein said sortation control initiates operating of the carrier belt of said forward one of said at least two transport units as a function of the distance of said forward one of said at least two transport units from the selected one of said ports and the distance of said leading edge of the parcel from a leading edge of said forward one of said at least two transport units.

32. The system in claim 25 wherein said sortation control initiates operating of the carrier belt of the at least one of said transport units conveying a parcel as a function of the distance of the leading edge of the parcel on that carrier belt from the selected one of said ports.

33. The system in claim 32 wherein said sortation control initiates operating of the carrier belt of the at least one of said transport units conveying a parcel as a function of the distance of said at least one of said transport units from the selected one of said ports and the distance of said leading edge of the parcel from a leading edge of said at least one of said transport units.

34. The system in claim 25 wherein at least certain ones of said ports each include at least two vertically related chutes and a flap for directing parcels to one of said at least two chutes and wherein said sortation control sets the position of said flap.

35. The system in claim 34 wherein said sortation control initiates setting the position of said flap as a function of the distance of the leading edge of the parcel on said carrier belt of said at least one of said transport units from the one of said ports associated with that flap.

36. The system in claim 35 wherein said sortation control initiates said setting as a function of the distance of said at least one of said transport units from the one of said ports associated with that flap and the distance of said leading edge of the parcel from a leading edge of said at least one of said transport units.

37. A crossbelt sortation system comprising:
a plurality of transport units moving in a conveying path between an induction station and a discharge station, each transport unit having a driven carrier belt thereon which is moveable orthogonally to the conveying path;
said discharge station having a plurality of receiving ports positioned along said conveying path;
said induction station having at least one induction belt extending at an angle to the conveying path; and
a transport unit test station positioned adjacent said conveying path for testing movement of the carrier belt associated with individual ones of said transport units passing the test station, each of said transport units including a magnet that moves in proportion to the linear speed of the carrier belt associated with that transport unit and said test station includes a sensor that senses the magnet of a transport unit passing the test station, said sensor including at least one magnetic-field sensitive device and a magnetic antenna coupled with said at least one magnetic-field sensitive device.

38. The system in claim 37 wherein each of said transport units further includes a rotatable pulley that rotates with linear movement of the carrier belt associated with that transport unit, wherein said magnet is positioned on said pulley for rotating with said pulley at a rotational speed that is a function of the linear speed of the associated carrier belt.

39. The system in claim 37 wherein said magnetic antenna is elongated in the direction of movement of said transport units along said conveying path.

40. The system in claim 39 wherein said magnetic antenna is made from a ferromagnetic material.

41. The system in claim 37 wherein said magnetic antenna is made from a ferromagnetic material.

42. The system in claim 37 wherein said antenna includes a pair of pole shoes that are galvanically isolated by said magnetic-field sensitive device.

43. The system in claim 42 wherein said pole shoes are elongated in the direction of movement of said transport units along said conveying path.

44. The system in claim 43 including a pair of magnetic-field sensitive devices galvanically isolating said pole shoes.

45. The system in claim 44 wherein said pair of magnetic-field sensitive devices are offset from each other in the path of movement of said magnet in response to linear movement of the carrier belt associated with that transport unit.

46. The system in claim 44 including a circuit coupled to said magnetic-field sensitive devices for producing an indication of the speed and direction of movement of the carrier belt associated with a transport unit passing said test station.

47. The system in claim 46 wherein said indication includes at least one digital word.

48. The system in claim 38 including a pair of said magnets radially positioned on opposite sides of said pulley.

49. The system in claim 37 wherein said magnetic-field sensitive device is a Hall-effect cell.

50. The system in claim 37 wherein said magnetic-field sensitive device is an inductive pick-up coil.

51. A method of conveying parcels on a plurality of transport units moving in a conveying path between an induction station and a discharge station, each transport unit having a driven carrier belt thereon which is moveable orthogonally to the conveying path, said induction station having at least one induction belt extending at an angle to the conveying path, said discharge station having a plurality of receiving ports positioned along said conveying path, including:
operating said at least one induction belt and said carrier belts of at least two contiguous transport units in order to position at least particular ones of said parcels on said at least two transport units by rotating each such parcel to position the parcel on said at least two transport units.

52. The method of claim 51 wherein said rotating includes operating said carrier belts of said at least two transport units until a parcel is positioned over the leading one of said at least two transport units and stopping said carrier belt of said leading one of said at least two transport units while operating said carrier belts of at least one following one of said at least two transport units until the parcel is positioned on said at least two transport units.

53. The method of claim 51 wherein operating said at least one induction belt includes determining the availability of at least one carrier unit and accelerating a parcel on said at least one induction belt to a loading speed according to a fixed velocity profile upon the availability of at least one carrier unit.

54. The method of claim 53 wherein said accelerating is initiated as a function of at least the length and width of said parcel.

55. The method of claim 51 including discharging said parcels to selected ones of said ports.

56. The method of claim 55 wherein said discharging includes rotating parcels that are positioned on at least two of said transport units while discharging said parcels that are positioned on at least two of said transport units.

57. The method of claim 56 wherein said discharging includes operating the carrier belt of a forward one of said at least two transport units while not operating the carrier belt of at least one trailing one of said at least two transport units.

58. The method of claim 57 wherein said discharging includes operating said carrier belt of said at least one trailing one of said transport units after a time delay.

59. The method of claim 58 wherein said operating of said carrier belts of both said forward one and said at least one trailing one of said at least two transport units is initiated at the same fixed location with respect to the selected one of said ports.

60. The method of claim 57 wherein said operating said carrier belt of said forward one of said at least two transport units is initiated as a function of the distance of the leading edge of the parcel on said carrier belt of said forward one of said at least two transport units from the selected one of said ports.

61. The method of claim 60 wherein said operating said carrier belt of said forward one of said at least two transport units is initiated as a function of the distance of said forward one of said at least two transport units from the selected one of said ports and the distance of said leading edge of the parcel from a leading edge of said forward one of said at least two transport units.

62. The method of claim 55 wherein said discharging includes operating the carrier belt of the at least one of said transport units conveying a parcel as a function of the distance of the leading edge of the parcel on said carrier belt of said at least one of said transport units from the selected one of said ports.

63. The method of claim 62 wherein said discharging includes operating the carrier belt of the at least one of said transport units conveying a parcel as a function of the distance of said at least one of said transport units from the selected one of said ports and the distance of said leading edge of the parcel from a leading edge of said at least one of said transport units.

* * * * *

UNITED STATES PATENT AND TRADEMARK OFFICE
CERTIFICATE OF CORRECTION

PATENT NO. : 5,588,520

DATED : December 31, 1996

INVENTOR(S) : Artemio Affaticati, et al.

It is certified that error appears in the above-identified patent and that said Letters Patent is hereby corrected as shown below:

Cover Page, [75] Inventors:
"Turin" should be --Torino--.

Column 6, line 38:
"dam" should be --data--.

Column 13, line 49:
"frown" should be --from--.

Column 14, line 61:
"carded" should be --carried--.

Signed and Sealed this

Third Day of April, 2001

*Attest:*

NICHOLAS P. GODICI

*Attesting Officer*  *Acting Director of the United States Patent and Trademark Office*